US011166789B2

(12) United States Patent
Cosse et al.

(10) Patent No.: US 11,166,789 B2
(45) Date of Patent: Nov. 9, 2021

(54) ADJUSTABLE-PRESCRIPTION ORTHODONTIC BRACKET ASSEMBLIES

(71) Applicant: Christopher C. Cosse, Shreveport, LA (US)

(72) Inventors: Christopher C. Cosse, Shreveport, LA (US); Todd Oda, Torrance, CA (US)

(73) Assignee: Christopher C. Cosse, Shreveport, LA (US)

( * ) Notice: Subject to any disclaimer, the term of this patent is extended or adjusted under 35 U.S.C. 154(b) by 334 days.

(21) Appl. No.: 16/142,518

(22) Filed: Sep. 26, 2018

(65) Prior Publication Data

US 2020/0093577 A1    Mar. 26, 2020

(51) Int. Cl.
*A61C 7/14* (2006.01)

(52) U.S. Cl.
CPC ..................................... *A61C 7/14* (2013.01)

(58) Field of Classification Search
CPC ........... A61C 7/14; A61C 7/141; A61C 7/143; A61C 7/145; A61C 7/146; A61C 7/148; A61C 7/16; A61C 7/18; A61C 7/20; A61C 7/22; A61C 7/28; A61C 7/282; A61C 7/285; A61C 7/287; A61C 7/30; A61C 7/303; A61C 7/306; A61C 7/34; A61C 7/12
USPC ................................... 433/16, 17, 10, 11, 12
See application file for complete search history.

(56) References Cited

U.S. PATENT DOCUMENTS 1,280,628 A   10/1918  Angle
1,821,171 A    9/1931  Atkinson 3,435,527 A    4/1969  Kesling
3,721,005 A    3/1973  Cohen
3,748,740 A    7/1973  Wildman
3,772,787 A   11/1973  Hanson
4,077,126 A    3/1978  Pletcher
4,139,945 A    2/1979  DiGiulio
4,144,642 A    3/1979  Wallshein
4,171,568 A   10/1979  Förster
4,197,642 A    4/1980  Wallshein
4,243,387 A    1/1981  Prins
4,248,588 A    2/1981  Hanson
(Continued)

FOREIGN PATENT DOCUMENTS

WO    WO 2010/105301 A1    9/2010

*Primary Examiner* — Jacqueline T Johanas
*Assistant Examiner* — Shannel Nicole Belk
(74) *Attorney, Agent, or Firm* — Dascenzo Gates Intellectual Property Law, P.C.

(57) ABSTRACT

Orthodontic bracket assemblies with archwire cradles that pivot in correspondence with the rotation of pivot-adjusting drums. The orthodontic bracket assemblies include a pivot-adjusting drum that is configured to be selectively rotated relative to a bracket base about an adjustment axis within a range of operative rotation positions, an archwire cradle that is configured to be selectively pivoted about a cradle axis relative to the bracket base within a range of operative pivot positions, and an adjustment driver that is operatively coupled to the archwire cradle and the pivot-adjusting drum and causes the archwire cradle to pivot relative to the bracket base in correspondence with a rotation of the pivot-adjusting drum. A rotation of the pivot-adjusting drum about the adjustment axis adjusts the torque that is applied to the patient's tooth during prescriptive use of the bracket assembly.

35 Claims, 7 Drawing Sheets

(56) References Cited

U.S. PATENT DOCUMENTS

| | | | |
|---|---|---|---|
| 4,353,692 | A | 10/1982 | Karrakussoglu |
| 4,371,337 | A | 2/1983 | Pletcher |
| 4,419,078 | A | 12/1983 | Pletcher |
| 4,443,189 | A | 4/1984 | Wildman |
| 4,492,573 | A | 1/1985 | Hanson |
| 4,496,318 | A | 1/1985 | Connelly, Jr. |
| 4,531,911 | A | 7/1985 | Creekmore |
| 4,559,012 | A | 12/1985 | Pletcher |
| 4,561,844 | A | 12/1985 | Bates |
| 4,597,739 | A | 7/1986 | Rosenberg |
| 4,614,497 | A | 9/1986 | Kurz |
| 4,655,708 | A | 4/1987 | Fujita |
| 4,698,017 | A | 10/1987 | Hanson |
| 4,712,999 | A | 12/1987 | Rosenberg |
| 4,867,678 | A | 9/1989 | Parker |
| 4,878,840 | A | 11/1989 | Reynolds |
| 5,094,614 | A | 3/1992 | Wildman |
| 5,224,858 | A | 7/1993 | Hanson |
| 5,302,121 | A | 4/1994 | Gagin |
| 5,320,526 | A | 6/1994 | Tuneberg |
| 5,322,435 | A | 6/1994 | Pletcher |
| 5,466,151 | A | 11/1995 | Damon |
| 5,562,444 | A | 10/1996 | Heiser et al. |
| 5,586,882 | A | 12/1996 | Hanson |
| 5,630,715 | A | 5/1997 | Voudouris |
| 5,711,666 | A | 1/1998 | Hanson |
| 5,857,850 | A | 1/1999 | Voudouris |
| 5,954,502 | A * | 9/1999 | Tuenge ............... A61C 7/14 433/16 |
| 6,193,508 | B1 | 2/2001 | Georgakis |
| 6,302,688 | B1 | 10/2001 | Jordan et al. |
| 6,358,045 | B1 | 3/2002 | Farzin-Nia et al. |
| 6,582,226 | B2 | 6/2003 | Jordan et al. |
| 6,632,088 | B2 * | 10/2003 | Voudouris ............ A61C 7/12 433/18 |
| 6,655,957 | B2 | 12/2003 | Abels et al. |
| 6,659,766 | B2 | 12/2003 | Abels et al. |
| 7,025,591 | B1 | 4/2006 | Kesling |
| 7,306,458 | B1 | 12/2007 | Lu |
| 7,431,586 | B1 * | 10/2008 | Silverman ............ A61C 7/14 433/9 |
| 7,771,640 | B2 | 8/2010 | Cosse |
| 7,819,660 | B2 | 10/2010 | Cosse |
| 7,963,768 | B2 | 6/2011 | Hilliard |
| 8,272,867 | B2 | 9/2012 | Chikami et al. |
| 8,333,586 | B2 | 12/2012 | Kantomaa |
| 8,337,198 | B2 | 12/2012 | Cosse |
| 8,366,440 | B2 | 2/2013 | Bathen et al. |
| 9,198,740 | B2 | 12/2015 | Damon et al. |
| 9,655,694 | B2 | 5/2017 | Cosse et al. |
| 9,795,456 | B2 * | 10/2017 | Bindayel ............... A61C 7/002 |
| 9,888,984 | B2 * | 2/2018 | Rudman ............... A61C 7/285 |
| 9,999,481 | B2 | 6/2018 | Cosse et al. |
| 10,653,504 | B2 * | 5/2020 | Cosse .................. A61C 7/14 |
| 2006/0172247 | A1 | 8/2006 | Abels et al. |
| 2008/0293005 | A1 | 11/2008 | Rahlis et al. |
| 2009/0130621 | A1 * | 5/2009 | Chikami ............... A61C 7/285 433/10 |
| 2011/0183280 | A1 | 7/2011 | Cosse et al. |
| 2012/0308952 | A1 | 12/2012 | Cosse |
| 2012/0315593 | A1 * | 12/2012 | Ramos-de-la-Pena .. A61C 7/14 433/9 |
| 2013/0078595 | A1 | 3/2013 | Solano Reina et al. |
| 2014/0045137 | A1 | 2/2014 | Solano Reina et al. |
| 2014/0205962 | A1 * | 7/2014 | Damon .................. A61C 7/14 433/13 |
| 2014/0272751 | A1 * | 9/2014 | Cosse .................... A61C 7/02 433/9 |
| 2014/0370454 | A1 | 12/2014 | Rudman |
| 2015/0017597 | A1 * | 1/2015 | Solano Reina ........ A61C 7/141 433/10 |
| 2015/0050612 | A1 * | 2/2015 | Damon .................. A61C 7/14 433/13 |
| 2015/0157422 | A1 * | 6/2015 | Cosse .................... A61C 7/14 433/16 |
| 2015/0182306 | A1 | 7/2015 | Chen et al. |
| 2016/0128804 | A1 * | 5/2016 | Ji ......................... A61C 7/141 433/16 |
| 2016/0175072 | A1 | 6/2016 | Andreiko et al. |
| 2016/0175073 | A1 | 6/2016 | Huang |
| 2017/0128165 | A1 * | 5/2017 | Bindayel ............. A61B 5/4547 |
| 2017/0128167 | A1 | 5/2017 | Bindayel |
| 2017/0128168 | A1 * | 5/2017 | Bindayel ................ A61C 7/14 |
| 2017/0252128 | A1 * | 9/2017 | Cosse .................. A61C 7/287 |
| 2018/0368947 | A1 * | 12/2018 | Cosse .................... A61C 7/28 |

\* cited by examiner

ADJUSTABLE-PRESCRIPTION ORTHODONTIC BRACKET ASSEMBLIES

FIELD OF THE DISCLOSURE

The present disclosure is directed generally to the orthodontic field, and more particularly to adjustable-prescription orthodontic bracket assemblies.

BACKGROUND OF THE DISCLOSURE

Orthodontic brackets typically are small, slotted devices for use during orthodontic treatment. The brackets usually are configured for attachment to front surfaces of teeth, either by directly cementing a bracket to a tooth surface or by bonding the bracket to a metal band that encircles the tooth, though in some instances brackets may be attached to back surfaces of teeth. Slots in the brackets, which may be referred to herein as archwire slots and/or as archwire passages, are disposed horizontally, or generally horizontally, and are configured to receive an archwire. Traditionally, an archwire is a resilient, curved piece of wire that may be bent and/or twisted prior to installation in the bracket slots, with an archwire typically extending through the slots of all of the orthodontic brackets that are attached to a patient's upper or lower teeth. Engagement between the archwire and the brackets creates corrective, or prescriptive, forces that are directed to the teeth by the orthodontic brackets to urge the teeth into a correct, or desired, alignment, or occlusion.

The archwire may be secured in the archwire slot of an orthodontic bracket by a variety of mechanisms, such as depending on the bracket configuration. For example, a "ligating" bracket typically requires a separate fastener, such as a ligature wire or elastic band, which is tied or otherwise positioned around ligating structures, such as tie wings, on the bracket body to secure the archwire in place within the archwire slot of a bracket. A "self-ligating" bracket, on the other hand, typically includes a clamp, gate, or other self-locking mechanism, such as a closeable archwire slot, that allows such a bracket to retain the archwire in the archwire slot without requiring the use of ligatures or other separate fasteners. Ligatures and/or supplemental fasteners or biasing structures also may be used with self-ligating brackets, but they are not required to retain the archwire in the archwire slot.

Regardless of whether the bracket is a self-ligating bracket or whether the bracket requires separate fasteners or ligatures to secure an archwire in the bracket's archwire slot, orthodontic treatment of a patient's teeth typically requires periodic adjustment of the forces that are imparted to the patient's teeth by the installed orthodontic brackets, archwire(s), etc. Adjustments include changing the magnitude and/or direction of the forces that are imparted to the patient's teeth, such as to adjust the degree to which torque, tip, and/or rotational forces are imparted to the patient's teeth to change the angulation, inclination, rotation, height and/or location of the teeth in order to move the teeth toward an optimal occlusion.

As used herein, tipping forces refer to forces applied to the tooth in the mesial-distal direction. Thus, tipping forces may impact angulation. Torsional forces refer to forces applied to the tooth by an archwire that is in torsion within the archwire passage. Thus, torsional forces tend to rotate the tooth in the buccal-lingual or labial-lingual direction and may impact inclination. Rotational forces refer to applied forces that tend to rotate the tooth about its long axis.

Adjustment of some of these forces, including torsional (i.e., torque) forces, typically requires removal of the archwire from the corresponding brackets, along with replacement of the archwire and, in some cases, removal and replacement of one or more brackets. Even with a bracket that permits the applied forces to be adjusted without removal of the bracket from a patient's tooth, fine adjustment of these forces still may be challenging. Thus, there exists a need for improved adjustable-prescription orthodontic brackets.

SUMMARY OF THE DISCLOSURE

Orthodontic bracket assemblies with archwire cradles that pivot in correspondence with the rotation of pivot-adjusting drums. The orthodontic bracket assemblies include a bracket base, which is configured to be secured to a tooth, an archwire cradle that is pivotally coupled to the bracket base, a pivot-adjusting drum that is pivotally coupled to the bracket base, and an adjustment driver that is operatively coupled to the archwire cradle and the pivot-adjusting drum for pivoting the archwire cradle to a selected pivot position in correspondence with a rotation of the pivot-adjusting drum. The archwire cradle includes, or at least defines a portion of, an archwire passage that is sized and operatively oriented to receive an archwire during use of the orthodontic bracket assembly to apply a prescriptive force to a patient's teeth.

The pivot-adjusting drum is configured to be selectively rotated relative to the bracket base about an adjustment axis within a range of operative rotation positions. The archwire cradle is configured to be selectively pivoted about a cradle axis relative to the bracket base within a range of operative pivot positions. The adjustment driver is operatively coupled to the archwire cradle and the pivot-adjusting drum, and causes the archwire cradle to pivot relative to the bracket base in correspondence with a rotation of the pivot-adjusting drum. Pivoting the archwire cradle about the cradle axis alters the orientation of the archwire slot relative to the base, and thereby relative to the tooth to which the base is secured. Accordingly, a rotation of the pivot-adjusting drum about the adjustment axis adjusts the torque that is applied to the patient's tooth during prescriptive use of the bracket assembly. The pivot-adjusting drum may be selectively rotated relative to the base about the adjustment axis, such as by an adjustment force imparted to the pivot-adjusting drum. In some embodiments, the orthodontic bracket assembly is configured to permit adjustment of the applied (and/or prescribed or selected) torque without requiring removal of an archwire that is located within the archwire slot. In some embodiments, the orthodontic bracket assembly includes a receiver that is configured to be operatively engaged by an adjustment tool that facilitates incremental adjustment of the torque responsive to corresponding incremental movements of the tool.

In some embodiments, the adjustment driver may be an arm that has a first end that is attached to the archwire cradle and a second end that contacts a surface of the pivot-adjusting drum. The point of contact of the second end of the adjustment driver moves along the surface of the pivot-adjusting drum as the pivot-adjusting drum is rotated. In such embodiments, the movement of the point of contact along the surface of the pivot-adjusting drum causes the adjustment driver to direct and/or guide the pivot position of the archwire cradle. Alternatively, in some embodiments the adjustment driver may be an arm that has a first end that is attached to the pivot-adjusting drum and a second end that contacts and moves along a surface of the archwire cradle to direct and/or guide the pivot position of the archwire cradle. In this way, when the pivot-adjusting drum rotates the adjustment driver also rotates, thereby directing and/or guiding the pivot position of the archwire cradle in correspondence with the rotation of the pivot-adjusting drum.

In some embodiments, the pivot-adjusting drum and/or archwire cradle are selectively retained in a selected orientation within the range of positions by a drum securement and/or cradle securement that are associated with the base of the bracket assembly. In some such embodiments, the bracket assembly includes one or more clutch, or release, mechanisms that are configured to selectively disengage the pivot-adjusting drum and/or the archwire cradle from the drum securement and/or cradle securement to permit relative rotation or adjustment therebetween. In some embodiments, the one or more clutch mechanisms are biased, such as spring-biased, to urge the drum securement and/or cradle securement to a disengaged position or an engaged position.

DETAILED DESCRIPTION

Figure 1:
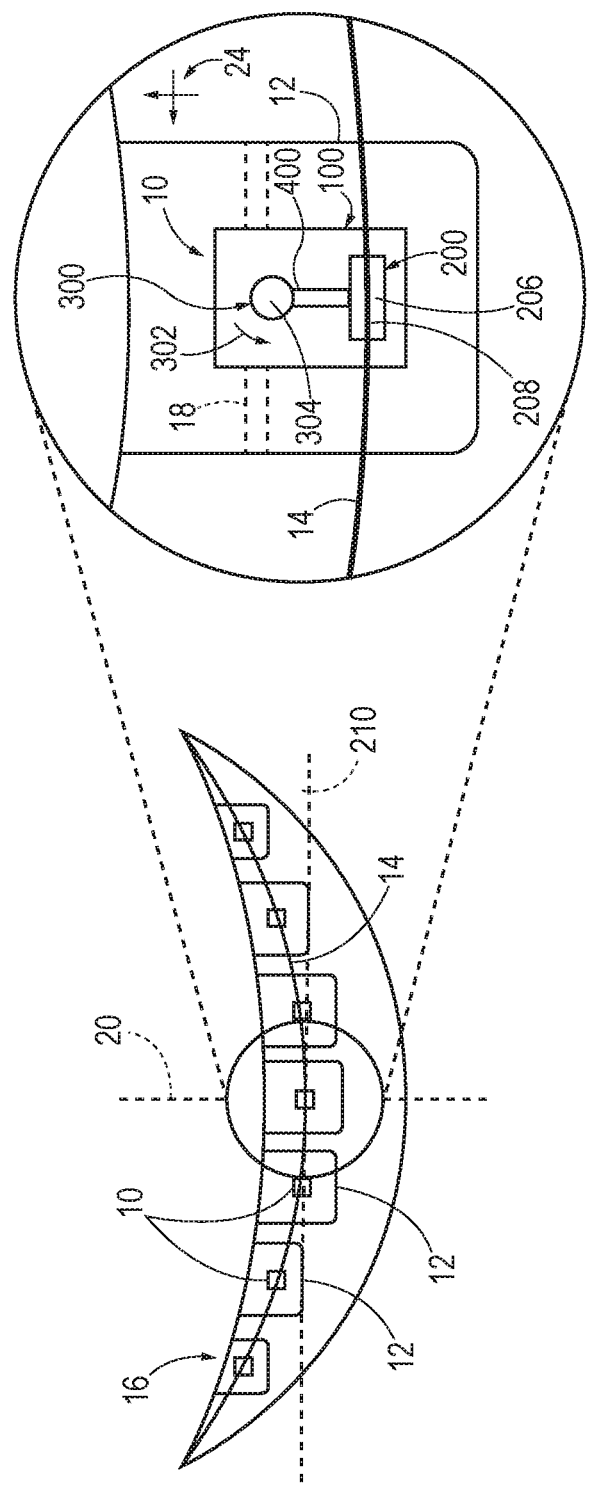
FIG. 1 is a schematic view of an example of an orthodontic bracket assembly according to the present disclosure during orthodontic use.
Figure 2:
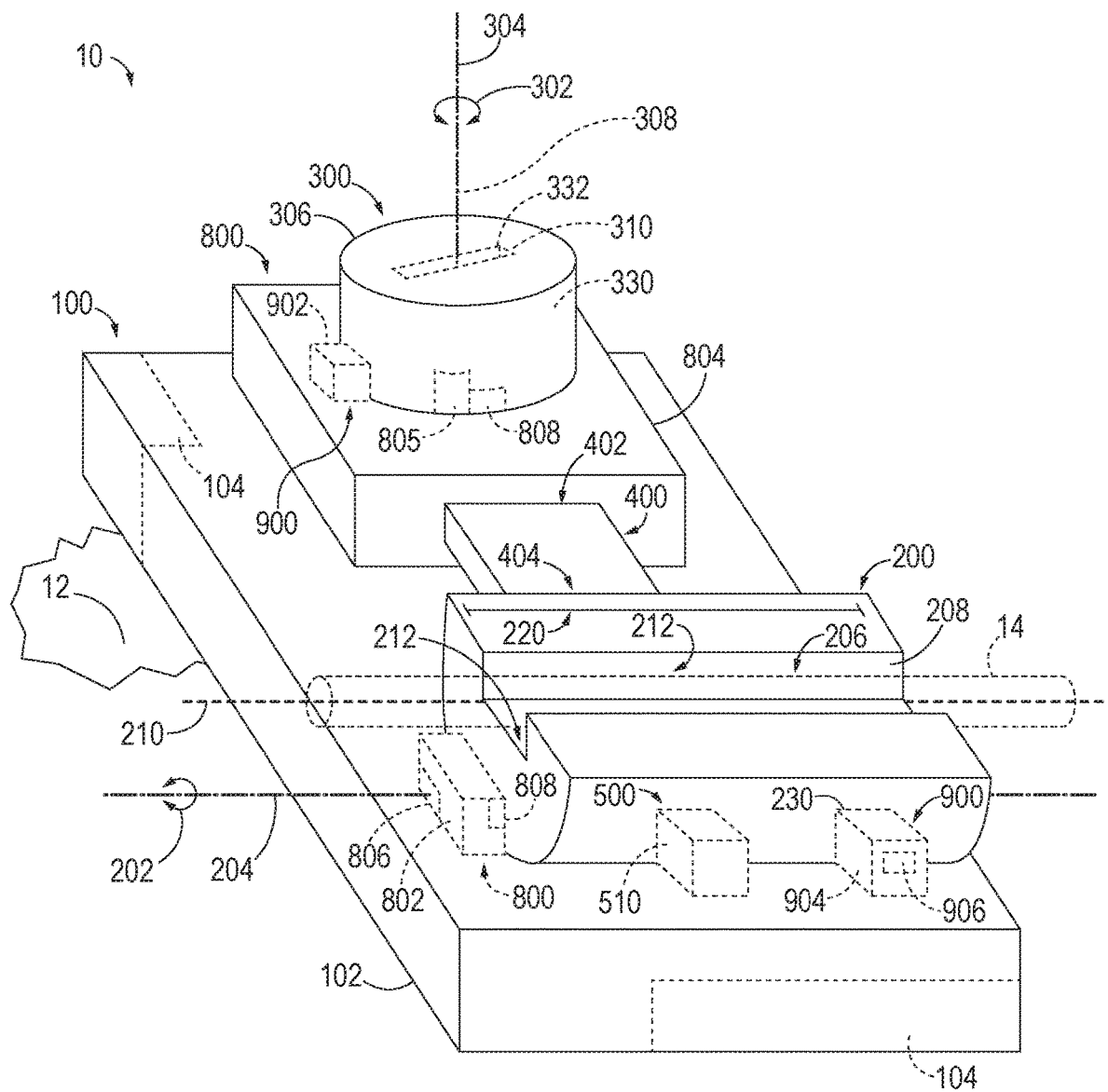
FIG. 2 is a schematic isometric elevation view of examples of an orthodontic bracket assembly according to the present disclosure.

FIGS. 1 and 2 provide schematic views of orthodontic bracket assemblies according to the present disclosure, with such bracket assemblies indicated generally at 10. Bracket assembly 10 includes a base 100 that is configured to be secured to a patient's tooth 12. Bracket assembly 10 further includes an archwire cradle 200, which is pivotally coupled to the base 100 for selective pivotal movement 202 between a range of pivot positions about a cradle axis 204 (shown in FIG. 2) relative to the base 100, and a pivot-adjusting drum 300 that is coupled to the bracket base 100 for rotational movement 302 about an adjustment axis 304 relative to the base. The archwire cradle 200 includes an archwire passage 206, which may be an elongate archwire passage 206. Passage 206 is sized to receive an archwire 14 during orthodontic use of the bracket assembly 10. Within the scope of the present disclosure, the archwire passage 206 may be described as an archwire slot, an elongate archwire slot, and/or an elongate archwire passage. Archwire passage 206 includes an inlet 208 through which the archwire 14 can be selectively inserted into the elongate archwire passage 206.

Additionally, bracket assembly 10 further includes an adjustment driver 400 that is in operative engagement with each of the pivot-adjusting drum 300 and the archwire cradle 200. The adjustment driver 400 is configured to pivot the archwire cradle 200 about the cradle axis 204 to a selected pivot position in correspondence with a rotational movement 302 of the pivot-adjusting drum 300 relative to the base 100. Within the scope of the present disclosure, the description that a first element moves "in correspondence with" a second element is used to signify that a movement of the first element causes and/or is caused by a corresponding movement of the second element. The movement of the first element may directly cause and/or be caused by the corresponding movement of the second element. For example, the first element may be in physical contact with the second element such that a movement of one element causes a displacement of the other element. Alternatively, the movement of the first element may indirectly cause and/or be caused by the corresponding movement via one or more intermediary elements, such as adjustment drivers, pivot arms, mechanical coupling mechanisms, drums, cradles, biasing mechanisms, etc.

During orthodontic use of the bracket assembly 10, each pivot position of the range of pivot positions of the archwire cradle 200 may define a different prescription and/or prescriptive force that is applied by the bracket assembly 10 to patient's tooth 12. Thus, according to the present disclosure, the adjustment driver 400 causes the prescription and/or prescriptive force applied by the bracket assembly 10 to change in correspondence with the rotational movement 302 of the pivot-adjusting drum 300 relative to the base 100.

The prescription of the bracket assembly 10 refers to the forces that are imparted to a patient's tooth 12 during orthodontic use of the bracket assembly 10. The prescription additionally or alternatively may be referred to as the applied forces, the prescriptive forces, the corrective forces, and/or simply as the forces that are imparted to the patient's tooth 12 during orthodontic use of the bracket assembly 10. This rotational adjustment provides a corresponding adjustment (and/or means for adjusting) of the torque, or torsional force, that is applied to the tooth 12 during prescriptive use of the bracket assembly 10. As used herein, "prescriptive use" and/or "orthodontic use" refer to use of a bracket assembly 10 that is secured to a patient's tooth 12, and which contains an archwire 14 operatively secured within the elongate archwire passage 206 to apply forces to the patient's tooth 12 to alter the relative orientation of the patient's tooth in the patient's mouth 16. Similarly, "operatively," when used to describe a relationship between two or more components or elements, refers to the functionality for which the components or elements are designed to be used, assembled, mounted, coupled, etc.

As illustrated in FIG. 1, base 100 is configured to be secured to a patient's tooth 12, either directly, such as by bonding or otherwise adhesively securing the base to the tooth, or indirectly, such as by securing or otherwise mounting the base on a band 18 that is secured to, or around, the patient's tooth 12. Base 100 provides a stable foundation for the components of bracket assembly 10 relative to the patient's tooth 12 to which the base 100 is secured. As shown in FIG. 1, base 100 may be mounted to the tooth 12 such that the long, or longitudinal, axis 210 of archwire passage 206 extends transverse to the long axis 20 (extending from the root to the tip) of the tooth 12. Base 100 of the bracket assembly additionally or alternatively may be referred to herein as the housing 100, body 100, frame 100, and/or component-receiving member 100 of the bracket assembly 10.

In general, elements that are likely to be included in a given (i.e., particular) embodiment are illustrated in solid lines in FIGS. 1 and 2, while elements that are optional to a given embodiment are illustrated in dashed lines. However, elements that are shown in solid lines are not essential to all embodiments, and an element shown in solid lines may be omitted from a particular embodiment without departing from the scope of the present disclosure. Elements that serve a similar, or at least substantially similar, purpose are labeled with like numbers in the Figures of the present disclosure, and these elements may not be discussed in detail herein with reference to each of the Figures. Similarly, all elements may not be labeled in each of the Figures, but reference numerals associated therewith may be utilized herein for consistency. Elements, components, and/or features that are discussed herein with reference to one or more of the Figures may be included in and/or utilized with any of the Figures without departing from the scope of the present disclosure.

As shown in FIG. 2, base 100 may be described as including a mounting surface 102, which additionally or alternatively may be referred to as a tooth-engaging surface 102 and/or a tooth-facing surface 102. In various embodiments according to the present disclosure, base 100 may be formed as a monolithic or other unitary, or one-piece, structure, although it also is within the scope of the present disclosure that the base may be formed from and/or include two or more base (or housing) members 104. This is illustrated schematically in FIG. 2 by a series of dashed lead lines associated with reference numeral 104. In some such embodiments, these base members, or base components, 104 may be secured in a fixed orientation relative to each other, such as after manufacturing of the base members, during assembly of bracket assembly 10, or after assembly of bracket assembly 10. Thus, after the base is assembled, the base members 104 function as a single, unitary structure.

In other embodiments, the base members 104 may be configured to be selectively repositioned relative to each other, such as to adjust a property of the bracket assembly 10 and/or the prescriptive forces provided thereby during prescriptive use of the bracket assembly 10. For example, relative translation, rotation, and/or angulation of one or more of the base members 104 relative to the rest of the base 100 and/or relative to tooth 12 may adjust the relative position of the elongate archwire passage 206 (compared to its position prior to this movement of one or more of the base members 104) and thereby alter the prescriptive force provided by the bracket assembly 10 during prescriptive use thereof. In various embodiments, this relative translation, rotation, and/or angulation of one or more of the base members 104 may correspond to selective adjustment of the relative orientation of the elongate archwire passage 206 to the plane of the tooth 12.

Base 100 also may, but is not required to, include additional components, regions, and/or features that are conventional to orthodontic bracket bases/bodies/housings, such as appropriately shaped and/or contoured tooth-contacting surfaces, tie wings, or other suitable mounts for ligating structures, such as ligatures, orthodontic chains, powerchains, springs, elastic bands, and the like. In this regard, examples of orthodontic brackets and bracket assemblies, as well as components and uses thereof, and accessories therefor, are disclosed in U.S. Pat. No. 8,337,198 and in U.S. Patent Application Publication Nos. 2012/0308952 and 2011/0183280, the complete disclosures of which are hereby incorporated by reference. These and the subsequently incorporated patent references additionally or alternatively disclose optional additional structures, features, components, and the like that may be used with bracket assembly 10 (so long as doing so does not impair the operation and functionality expressly presented herein).

Additional examples of ligating orthodontic brackets are disclosed in U.S. Pat. Nos. 6,302,688, 6,582,226, 4,597,739, 4,878,840, 3,772,787, 4,248,588, 4,492,573, 4,614,497, 4,698,017, 1,280,628, 1,821,171, and 3,435,527, the disclosures of which are hereby incorporated by reference. Examples of self-ligating orthodontic brackets are disclosed in U.S. Pat. Nos. 6,659,766, 6,655,957, 6,358,045, 6,193,508, 5,857,850, 5,711,666, 5,562,444, 5,322,435, 5,094,614, 4,559,012, 4,531,911, 4,492,573, 4,419,078, 4,371,337, 4,077,126, 4,144,642, 4,248,588, 4,698,017, 3,772,787, 4,561,844, 4,655,708, 4,197,642, 4,712,999, and 4,171,568, the disclosures of which are hereby incorporated by reference. Still further additional examples of orthodontic brackets are disclosed in U.S. Pat. Nos. 7,819,660, 7,771,640, and 6,632,088, the disclosures of which are hereby incorporated by reference. The structures, features, applications, and methods of the above-identified references may be utilized with and/or incorporated into orthodontic bracket assemblies 10, and orthodontic appliance systems that include a plurality of bracket assemblies 10, according to the present disclosure to the extent that doing so does not conflict with the express provisions of the present disclosure.

As discussed above, bracket assembly 10 includes an archwire cradle 200, which is pivotally coupled to the base 100 for selective pivotal movement 202 relative to the base 100. This selective rotation of the archwire cradle 200 is about a cradle axis 204. In various embodiments, the cradle axis 204 is generally parallel to a long axis 210 of archwire passage 206. The archwire cradle 200 defines an elongate archwire passage 206 that is sized to receive an archwire 14 during orthodontic use of the bracket assembly 10, and which rotates with the archwire cradle 200 about the cradle axis 204 and relative to the base 100. For example, FIG. 2 schematically illustrates the archwire cradle 200 as being a rectangular recess within the archwire cradle 200. The elongate archwire passage 206 includes an inlet, or opening, 208 through which the archwire 14 can be selectively inserted into the elongate archwire passage 206.

References herein to archwire cradle 200 defining at least a portion of elongate archwire passage 206 of the bracket assembly relate to the fact that archwire cradle 200 includes, or defines, at least one, and often at least two or at least three of the archwire-contacting wall structures, or barriers, 212 that define elongate archwire passage 206, such as shown in FIG. 2. The wall structures 212 that define the elongate archwire passage 206 may extend along the full length 220 of the archwire cradle 200, or may extend along a portion of the length 220 of the archwire cradle 200. Examples of configurations for wall structures 212 are disclosed in U.S. Patent Application Publication No. 2011/0183280, which is incorporated herein by reference.

As should be understood, the prescriptive, or corrective, forces imparted to tooth 12 may be generated by the archwire 14 exerting forces against the bracket assembly (such as against the portions of archwire cradle 200 and/or other portions of the bracket assembly that define the elongate archwire passage 206), by the bracket assembly 10 against the archwire 14, or both.

While elongate archwire passage 206 is schematically illustrated as being rectangular in FIG. 2, it is within the scope of the present disclosure that elongate archwire passage 206 may have any desired cross-sectional shape, including rectangular, square, circular, semi-circular, elliptical, triangular, trapezoidal, any polygonal or non-polygonal shape, irregular, symmetrical, monolithic, braided, uniform, and/or non-uniform, may not have a constant cross-section, or profile, and may contain internal structures that cause it to depart from an idealized geometry. It also is within the scope of the present disclosure that the elongate archwire passage 206 may not form a continuous perimeter around the cross-section of the archwire 14 but simply may serve, or function, to retain the archwire within a desired location. Thus, the elongate archwire passage 206 may comprise and/or receive at least hook, clip, biasing member, spring, elastomer, or other structure that constrains or urges the archwire within a defined region. Elongate archwire passage 206 additionally or alternatively may be referred to as an archwire passage, archwire slot, and/or an archwire receiver.

Figure 7:
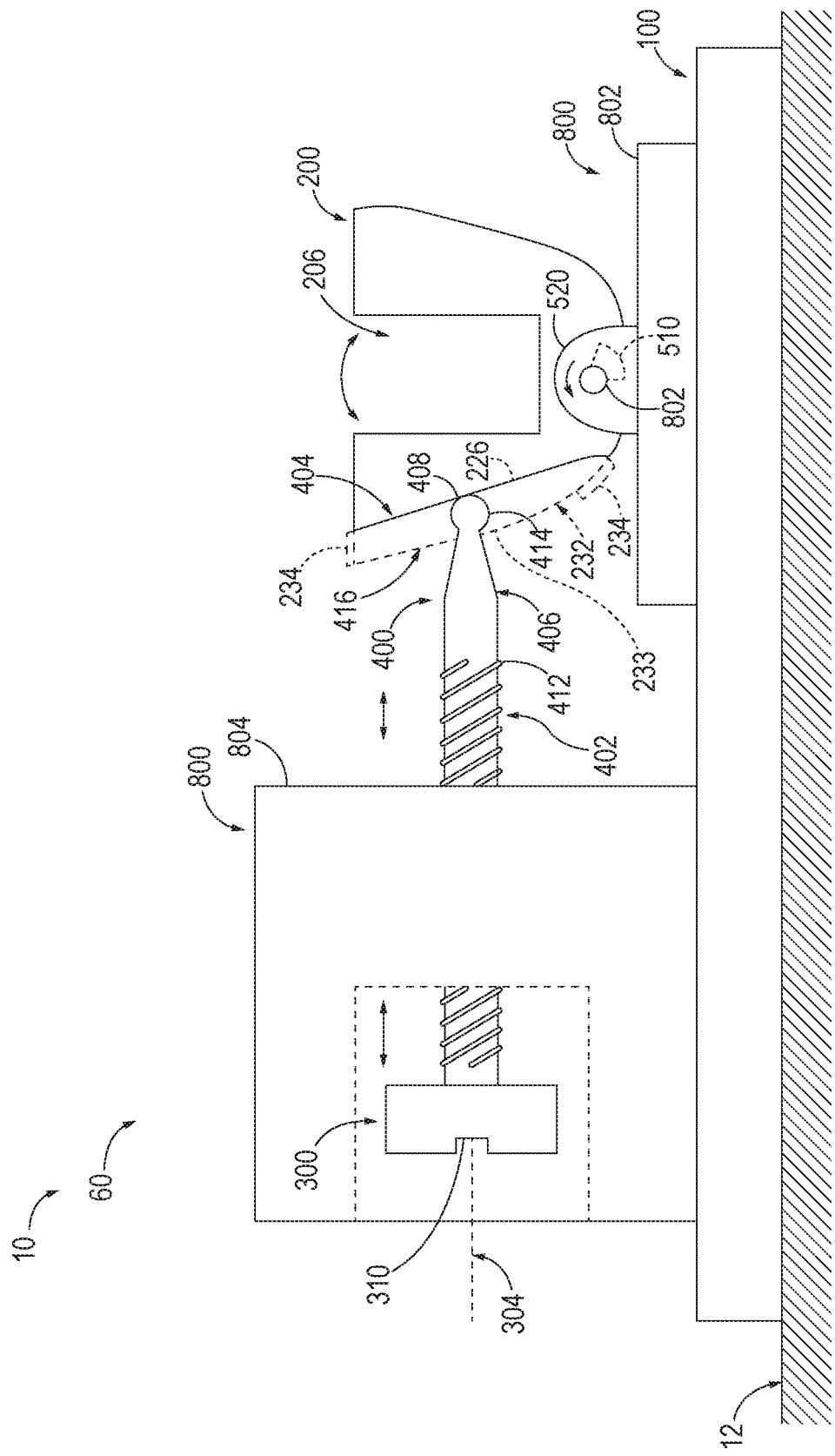
FIG. 7 is a side view of an example orthodontic bracket assembly according to the present disclosure having an adjustment axis parallel to a tooth surface during orthodontic use.

Bracket assembly 10 also includes a pivot-adjusting drum 300 that is coupled to the bracket base 100 for selective rotational movement 302 about an adjustment axis 304 relative to the base 100. It is within the scope of the present disclosure that pivot-adjusting drum 300 additionally or alternatively may be referred to as a pivot-adjusting member 300, a pivot-adjusting core 300, a pivot-adjusting rotational member 300, a pivot-adjusting screw 300, and/or a threaded pivot-adjusting rotational body 300. For example, FIG. 2 schematically illustrates the pivot-adjusting drum 300 as including a cylindrical structure 306, and the adjustment axis 304 as corresponding to the cylindrical axis 308 of the cylindrical structure 306. According to the present disclosure, in various embodiments the adjustment axis can be parallel to, perpendicular to, or have a different angular relationship with the a surface of the patient's tooth during orthodontic use of the bracket assembly. As an example, adjustment axis 304 is depicted in FIG. 2 as being perpendicular with the surface of tooth 12. Additionally, FIG. 7 depicts an example of a pivot-adjusting drum 300 that is configured to rotate about an adjustment axis 304 that is parallel to the surface of tooth 12. Additionally, while FIG. 2 illustrates adjustment axis 304 as being transverse to cradle axis 204, this is not required to all embodiments according to the present disclosure, and the adjustment axis 304 can have other angular relationships with respect to the cradle axis 205.

FIGS. 2-5 illustrate the pivot-adjusting drum 300 as including a receiver 310 that is configured to engage with an adjustment tool, and to receive an adjustment force from the adjustment tool. For example, the receiver 310 may include a socket, slot, or other interface that is configured to be operatively engaged by an adjustment tool, and which facilitates incremental adjustments of the rotational position of the pivot-adjusting drum 300 in response to corresponding incremental movements of the tool.

As schematically shown in FIG. 2, bracket assembly 10 includes one or more coupling mechanisms 800, which are configured to provide and/or guide the relative movement of the archwire cradle 200 and the pivot-adjusting drum 300 relative to base 100. Coupling mechanisms 800 may additionally or alternatively be referred to herein as positioning mechanisms 800, coupling systems 800, rotational coupling mechanisms 800, pivotal mechanisms, and/or adjustment mechanisms 800.

Coupling mechanisms 800 may include any suitable structure and/or number, shape, and/or configuration of components, or coupling members, that are configured to define and/or guide the rotational movement of archwire cradle 200 and the pivot-adjusting drum 300 relative to base 100, such as along a range of positions, which may be rotational positions. As discussed, the range of positions may include a plurality of spaced-apart positions, which may be (pre)defined positions and/or user-selected defined positions. As shown in FIG. 2, adjustment mechanisms 800 include a cradle coupling mechanism 802 that guides the pivotal movement of archwire cradle 200 and elongate archwire passage 206 in relation to base 100, and a drum coupling mechanism 804 that guides the rotational movement of the pivot-adjusting drum 300 relative to base 100.

Coupling mechanisms 802 and 804 are depicted schematically in FIG. 2, and it is within the scope of the present disclosure that one or more of coupling mechanisms 802 and 804 may include a plurality of coupling members 806, optionally including inter-engaging and/or complimentarily configured coupling members 806, that are associated with, mounted on, and/or formed in or on one or more of the base 100, the archwire cradle 200, and the pivot-adjusting drum 300. For example, where the pivot-adjusting drum 300 includes a cylindrical structure, the drum coupling mechanism 804 may be a threaded section that causes the cylindrical structure to rotate about the adjustment axis 304 in response to the rotation of the pivot-adjusting drum 300 relative to the bracket base 100. In other examples, coupling mechanisms 802 and 804 may include, and/or comprise coupling members 806 that may be, include, and/or form a portion of, any suitable guide, track, gear, race, rail, and/or similar structure for enabling this relative, optionally rotatable, movement. As examples, one of the base 100, the archwire cradle 200, and the pivot-adjusting drum 300 may include at least one track, guide, slide, channel, race, gear, or similar path-defining structure, and another of the base 100, the archwire cradle 200, and the pivot-adjusting drum 300 may include at least one gear, carriage, arm, pin, sled, or similar structure whose path of movement is dictated by the path-defining structure.

As discussed, archwire cradle 200 may be described as being pivotally coupled to, and/or coupled for selective pivoting relative to, base 100, and the pivot-adjusting drum 300 may be described as being rotatably coupled to, and/or coupled for selective rotation relative to, base 100. Accordingly, coupling mechanisms 800 may be described as enabling this pivotal and rotational movement of the archwire cradle 200 and the pivot-adjusting drum 300 relative to the base 100, such as within a range, or path, of pivotal or rotational movement. In connection with defining this range of rotational adjustment and/or rotational movement, coupling mechanisms 800 optionally may further include and/or define at least one stop, or barrier, 805 that defines the end points of the ranges of relative pivoting and rotation of the archwire cradle 200 and the pivot-adjusting drum 300 with respect to the base 100. By limiting the ranges of relative pivoting of the archwire cradle 200, the at least one stop 806 also defines end points for the range of pivotal orientations of the elongated archwire passage 206 relative to the tooth 12.

As examples, archwire cradle 200 may be configured to be selectively pivoted within a range of at least 15°, at least 20°, at least 30°, at least 40°, or at least 50°, and/or at most 90°, at most 70°, at most 60°, at most 50°, at most 40°, or at most 30°. These examples of ranges are measured relative to a neutral, or zero, position in which the elongate archwire passage 206 is not rotated relative to the plane of the tooth (illustrated as element 24 in FIG. 1) and/or the bracket 10. Additionally, the pivot-adjusting drum 300 may be configured to be rotated in a clockwise and counterclockwise direction within a set range (such as, for example within at least 90°, at least 180°, at least 270°, at least 360°, at least 540°, at least 720°, and/or at most 90°, at most 180°, at most 270°, at most 360°, at most 540°, at most 720°, etc.), or may be coupled to be rotated without a range limit. These examples of ranges of coupling mechanisms 800 optionally may be described as defining both positive and negative values. For example, a rotational range of 40° additionally or alternatively may be described as an inclusive range from −20° to +20°.

Coupling mechanisms 800 may be configured to permit the archwire cradle 200 and the pivot-adjusting drum 300 to be adjusted to any angular value within this range, such as when the coupling mechanism utilizes a frictional or similar retainer that is infinitely adjustable within the range. However, it also is within the scope of the present disclosure that the coupling mechanism may be configured to permit one or both of the archwire cradle 200 and the pivot-adjusting drum 300 to be adjusted within predetermined, or predefined, increments or intervals within the overall range. Examples of such increments include 1°, 2°, 2.5°, 3°, 4°, 5°, 7.5°, 3°-8°, 4°-6°, 4°-10°, at least 2.5°, at least 3°, at least 5°, at most 10°, at most 8°, at most 6°, and/or at most 4°, although others may be used without departing from the scope of the present disclosure.

As shown in FIG. 2, individual coupling mechanisms 800 may include, be associated with, and/or operatively be engaged by a positioning assembly 808 that selectively retains the archwire cradle 200, the pivot-adjusting drum 300, or both in a selected rotational position relative to the base 100. It follows then that the positioning assembly 808 additionally or alternatively may be described as selectively retaining the archwire passage, and thus any archwire that is secured within the passage, in a selected, or defined, orientation and/or prescription relative to the base and/or to the tooth to which the base is mounted. Positioning assembly 808, when present, may selectively retain the archwire cradle 200, the pivot-adjusting drum 300, or both, in an angular position within a set of predefined, or predetermined, angular positions, or from an infinite array of angular positions, as discussed. As used herein, the angular position within which the positioning assembly 808 selectively secures, or retains, the archwire cradle 200, the pivot-adjusting drum 300, or both, may be referred to as a retained position. The retained position may be predefined, such as within a plurality of incrementally spaced positions, and/or may be user-determined. For example, a retained position may correspond to an angular position in which the positioning assembly 808 frictionally or otherwise retains, and/or operatively engages the archwire cradle 200, the pivot-adjusting drum 300, or both. The angular position may be set by a user, such as an orthodontist or technician actuating or otherwise engaging the positioning assembly 808 during orthodontic use of the bracket assembly 10.

As shown in FIG. 2, bracket assembly 10 further includes an adjustment driver 400 that is operatively coupled to the archwire cradle 200 and the pivot-adjusting drum 300, and which is configured to pivot the archwire cradle 200 about the cradle axis 204 to a selected pivot position in correspondence with a rotation 302 of the pivot-adjusting drum 300 relative to the base 100. Specifically, the operative engagements between the adjustment driver 400 and each of the archwire cradle 200 and the pivot-adjusting drum 300 cause the adjustment driver 400 to pivot the archwire cradle 200 about the cradle axis 204 in response to, and in correlation with, a rotation of the pivot-adjusting drum 300 about the adjustment axis 304. In this way, the adjustment driver 400 transforms rotational forces applied to the pivot-adjusting drum 300 (e.g., such as adjustment forces applied to the receiver 310 via an adjustment tool) into corresponding adjustments of the pivot positions of the archwire cradle. Therefore, since each pivot position of the archwire cradle 200 defines a different prescription and/or prescriptive force that is applied by the bracket assembly 10 to patient's tooth 12 during prescriptive use of the bracket assembly 10, the adjustment driver 400 transforms rotational forces applied to the pivot-adjusting drum 300 into corresponding adjustments of the prescription and/or prescriptive force applied by the bracket assembly 10.

Figure 5:
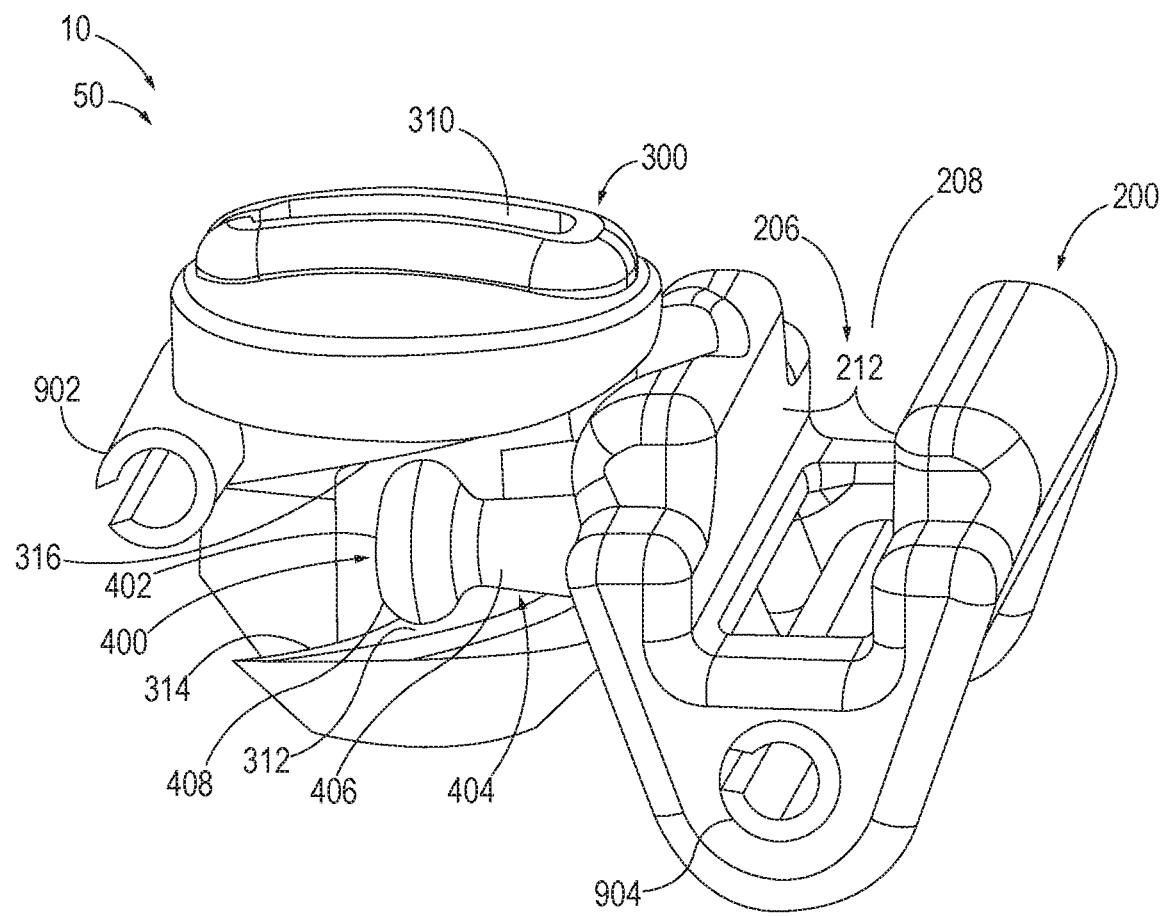
FIG. 5 is a side elevation view of the orthodontic bracket assembly of FIG. 3 illustrating an example coupling between a pivot-adjusting drum, archwire cradle, and adjustment driver according to the present disclosure.

According to the present disclosure, the adjustment driver 400 is interconnected to each of the archwire cradle 200 and the pivot-adjusting drum 300 via operative engagements. For example, as illustrated in FIGS. 2 and 5, these operational engagements may include (i) a rotational operational engagement 402 between the adjustment driver 400 and the pivot-adjusting drum 300 that may be configured to cause a translation of the adjustment driver 400 in response to, and in correspondence with, a rotation of the pivot-adjusting drum 300, and (ii) a pivotal operational engagement 404 between the adjustment driver 400 and the archwire cradle 200 that may be configured to cause a pivot of the archwire cradle 200 in correspondence with the translation of the adjustment driver 400.

Each of these examples of operative engagements may correspond to one or more types of coupling that are functionally designed to enable the adjustment driver 400 to pivot the archwire cradle 200 in correspondence with a rotation of the pivot-adjusting drum 300. For example, operative engagements may include dynamic connections such as pivots, ball and sockets, hooks, joints, hinges, slide surfaces, races, tracks, ramps, rollers, etc., and/or static connections such as fixed connections, welded elements, bonded elements, glued, soldered, or otherwise connections in which the adjustable driver 400 functionally acts as an extension of at least one of the archwire cradle 200 and the pivot-adjusting drum 300.

As schematically illustrated in FIG. 2, the pivot-adjusting drum 300 and/or archwire cradle 200 may be selectively retained in a selected orientation within the range of positions by a securement mechanism 900. For example, the pivot-adjusting drum 300 may be selectively retained in a selected pivot orientation by a drum securement 902. The drum securement 902 may include a spring pin that extends transverse to the adjustment axis 304 and is in engagement between the bracket base 10 and the pivot-adjusting drum 300. The drum securement 902 may be in engagement between the bracket base 10 and the pivot-adjusting drum 300 along a distal side of the pivot-adjusting drum 300 that is opposite an internal side of the pivot-adjusting drum 300 to which the adjustment driver 400 is operatively engaged. As further illustrated in FIG. 2, the archwire cradle 200 may be selectively retained in a selected rotational orientation by a cradle securement 904. The archwire cradle securement 904 may be in engagement between the bracket base 100 and a securement shoulder 230 that is located along a distal side of the archwire cradle 200 that is opposite an internal side of the archwire cradle 200 to which the adjustment driver 400 is operatively engaged. For example, the archwire cradle securement 904 may include a spring pin that extends along the cradle axis and is in engagement between the bracket base 100 and the archwire cradle 200.

In the present disclosure, "selectively retained" corresponds to the securement mechanism 900 having a locked configuration in which the securement mechanism 900 restricts the movement of an associated component of the bracket assembly 10, and an open configuration in which the securement mechanism 900 allows the associated component to move relative to the bracket assembly 10. "Selectively retained" further corresponds to the securement mechanism 900 being configured to switch from the open configuration to the closed configuration without damaging the securement mechanism 900 or another component of the bracket assembly 10.

In some embodiments, the securement mechanism 900 includes one or more clutch, or release, mechanisms that are configured to selectively disengage the pivot-adjusting drum and/or the archwire cradle from the drum securement 902 and/or cradle securement 904 to permit relative rotation or adjustment therebetween. In some embodiments, the one or more clutch mechanisms are biased, such as spring-biased, to urge the drum securement and/or cradle securement to a disengaged position or an engaged position. One or both of the drum securement 902 and/or cradle securement 904 may include a receiver 906 that is configured to engage with, or be engaged by, an adjustment tool, and to reconfigure the associated securement mechanism 900 between the open configuration and the locked configuration. For example, FIG. 2 illustrates the cradle securement 904 as including a receiver 906 that is configured to disengage the cradle securement 904 (i.e., reconfigure the cradle securement 904 from the locked configuration to the open configuration) in response to the receiver 906 receiving an adjustment force from an adjustment tool.

FIG. 2 further schematically illustrates bracket assembly 10 as optionally including at least one biasing mechanism, or biasing assembly, 500 that is configured to bias, or urge, the archwire cradle 200 to an adjustment position. For example, an archwire cradle biasing mechanism 510, when present, may form a portion of cradle coupling mechanism 802, and may bias the archwire cradle 200 toward or away from the pivot-adjusting drum 300. In some embodiments, the adjustment driver 400 may cause the archwire cradle 200 to rotate in response to a pivot of the pivot-adjusting drum 300 in one of a clockwise or counter-clockwise direction, and a biasing mechanism 500 may cause the archwire cradle 200 to rotate in an opposite direction in response to a pivot of the pivot-adjusting drum 300 in the other of the clockwise or counter-clockwise direction.

Biasing mechanism 500 may include any suitable type and/or number of components, or biasing members, that directly or indirectly provide the biasing, urging, and/or forces described herein. Examples of suitable biasing members include, but are not limited to, springs, elastomeric members, and/or resilient members. In some embodiments, a biasing member may interconnect and/or extend between at least two components of the bracket assembly. For example, a biasing member may interconnect the archwire cradle 200 with the base 100, and or the pivot-adjusting drum 300 to a pivot position. As another example, the biasing mechanism may be configured to urge a securement mechanism to a locked configuration or to an unlocked configuration.

It is within the scope of the present disclosure that base 100, archwire cradle 200, elongate archwire passage 206, pivot-adjusting drum 300, adjustment driver 400, and the other components of bracket assembly 10 may have any suitable shape and relative size. Specifically, FIGS. 1 and 2 are schematic illustrations that are not intended to be interpreted to limit the present disclosure to only the schematically illustrated shapes and/or relative sizes. For example, while a cylindrical body 330 and a planar face 332 may be a suitable configuration for pivot-adjusting drum 300, other configurations may be used without departing from the scope of the present disclosure. Similarly, while arch wire cradle 200 is illustrated schematically in FIGS. 1-2 as having a generally rectangular cross-sectional configuration, other shapes (geometric, regular, irregular, complex, etc.) may be used within the scope of the present disclosure. In another example, even when referred to as a "drum," pivot-adjusting drum 300 is not required in all embodiments to have a partially or completely cylindrical or spherical shape. In many embodiments, the pivot-adjusting drum 300 will include an arcuate region that at least partially defines the rotatable path of movement of the pivot-adjusting drum 300. However, other configurations and shapes may be used, including configurations in which the drum is mounted on and/or includes an axle that defines the rotational path of the pivot-adjusting drum 300.

Additional, less schematic, examples of bracket assemblies 10 according to the present disclosure are disclosed in FIGS. 3-7. These additional examples include (1) a bracket assembly 10 in the form of an orthodontic bracket assembly in which the adjustment driver 400 is an arm extending from archwire cradle 200, such as shown in FIGS. 3-6 and generally indicated at 50, and (2) a bracket assembly 10 in the form of a bracket assembly 10 in the form of an orthodontic bracket assembly in which the adjustment driver 400 is an arm extending from pivot-adjusting drum 300, such as shown in FIG. 7 and generally indicated at 60.

Unless otherwise indicated, the reference numerals, variants, and options that were introduced in the preceding discussion of bracket assemblies 10 in connection with FIGS. 1 and/or 2 are applicable to bracket assemblies 50 and 60. Accordingly, the same reference numerals will be utilized in many of FIGS. 3-7, and for the sake of brevity, not every element, component, example, variant, option, etc. will be discussed again in connection with bracket assemblies 50 and 60, and not every applicable reference numeral will be utilized in each of FIGS. 3-7. However, it is within the scope of the present disclosure that unless otherwise indicated, the previously discussed elements, components, examples, variants, options, etc. may be utilized with the subsequently discussed bracket assemblies. Thus, bracket assemblies 50 and 60 illustrate additional examples of bases 100, archwire cradles 200, pivot-adjusting drums 300, adjustment drivers 400, biasing mechanisms 500, coupling mechanisms 800, and/or securement mechanisms 900.

In FIGS. 3-6, collectively, bracket assembly 10 is a bracket assembly 50 that includes a pivotal archwire cradle 200 that selectively receives an archwire 14 within an archwire slot 206 that is defined by, or within, the archwire cradle 200. Archwire 14 is schematically illustrated and may have any suitable cross-sectional configuration, as is known in the art, including circular, square, or rectilinear cross-sectional shapes measured transverse to the long axis of the archwire. The archwire cradle 200 is selectively rotated within a range of positions relative to base 100, and thus relative to a tooth to which the bracket assembly is mounted during prescriptive use. This rotation alters the relative rotational orientation of the archwire relative to the base and/or tooth, thereby altering the prescriptive forces that are imparted to the tooth during prescriptive use of the bracket assembly.

Figure 3:
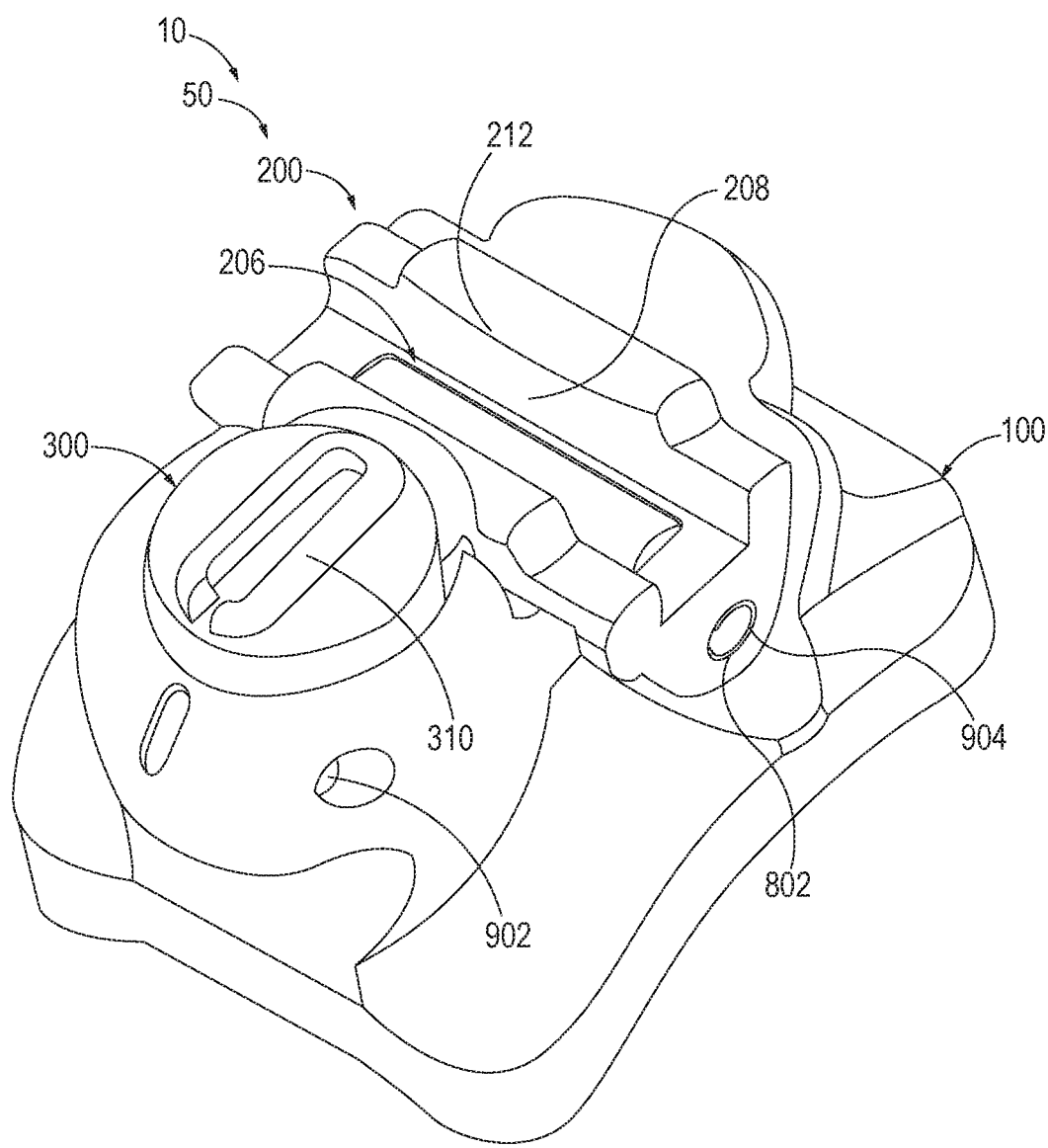
FIG. 3 is an isometric view of an example orthodontic bracket assembly according to the present disclosure having an adjustment axis perpendicular to a tooth during orthodontic use.
Figure 4:
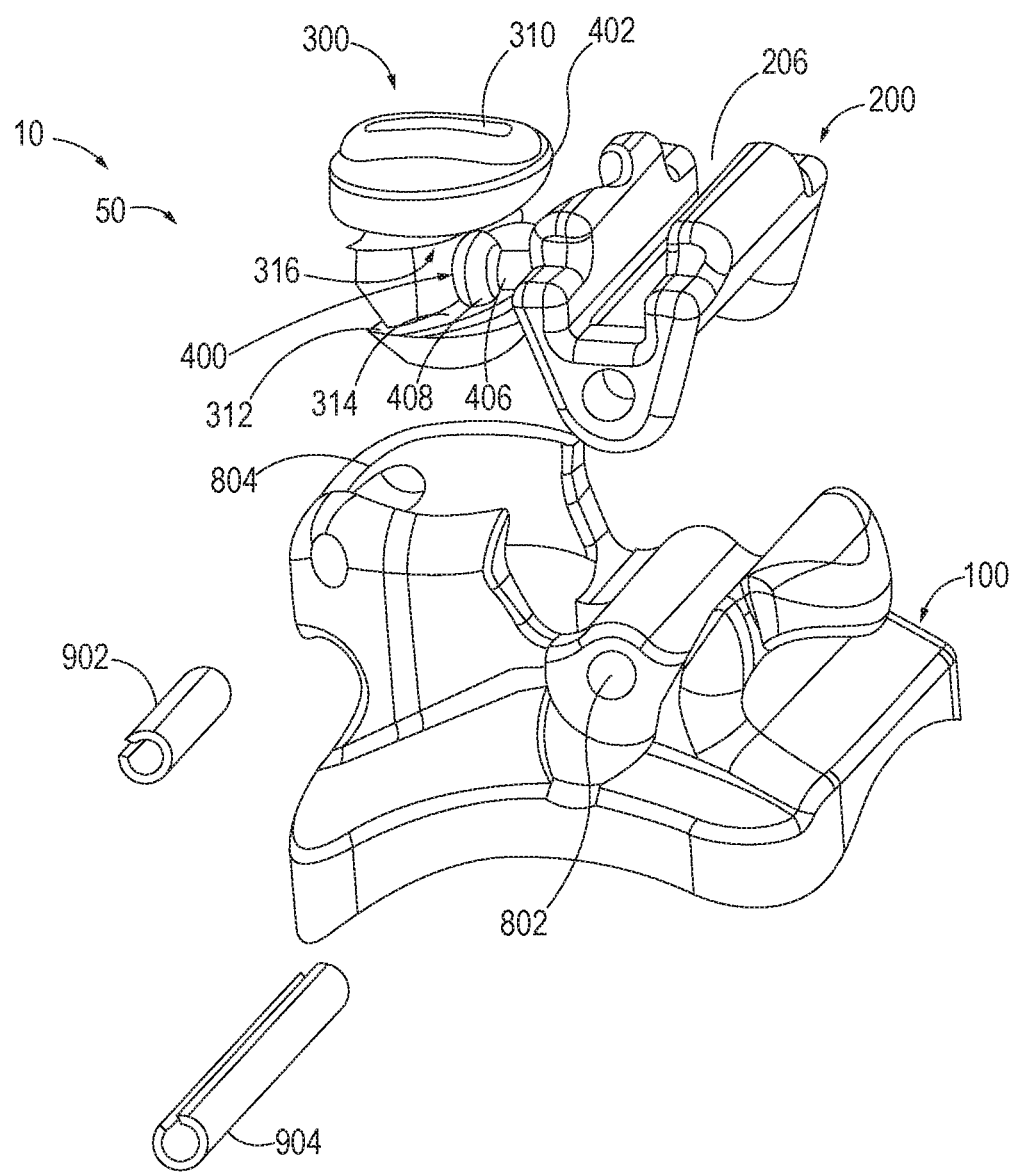
FIG. 4 is an exploded isometric view of the example orthodontic bracket assembly of FIG. 3.
Figure 6:
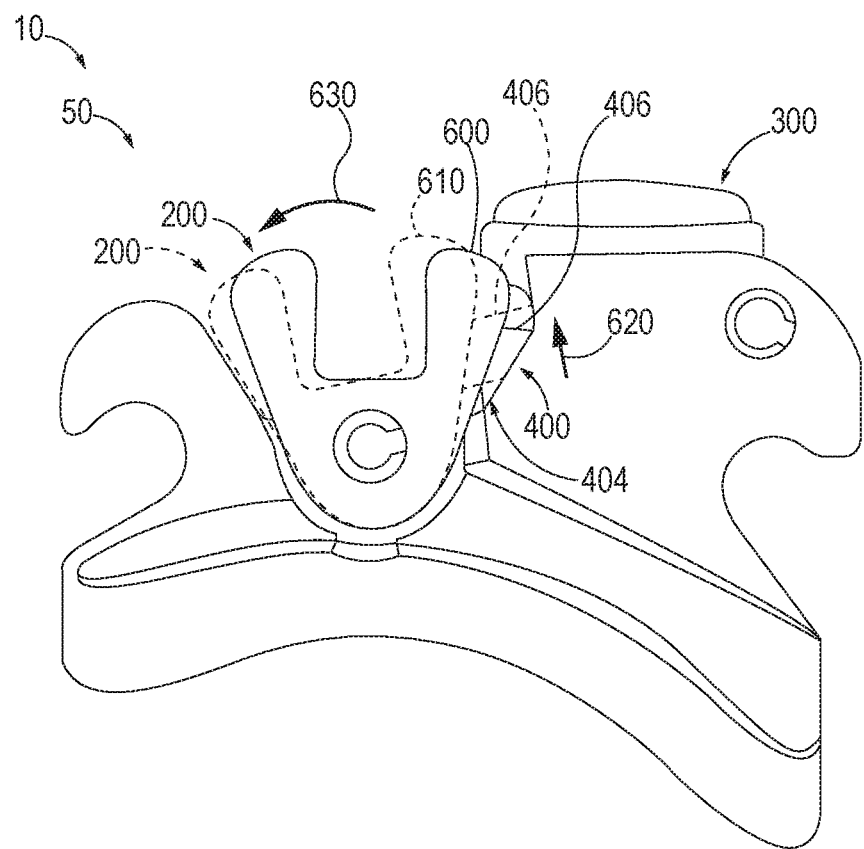
FIG. 6 is a side elevation view illustrating the orthodontic bracket assembly of FIG. 3 in multiple pivot positions.

In FIG. 3, an isometric view of an example embodiment of the bracket assembly 50 is shown. In FIG. 4, an example embodiment of the bracket assembly 50 is shown in an exploded isometric view to permit easier viewing of the components of the bracket assembly 50. In FIG. 5, the bracket assembly is shown in an assembled state in which an archwire is received and retained in the archwire slot of the archwire cradle 200. In FIG. 6, an example operative combination of the archwire cradle 200, pivot-adjusting drum 300, and adjustment driver 400 is shown. In FIG. 6, the base 100, biasing mechanisms 500, coupling mechanisms 800, and/or securement mechanisms 900 are not illustrated to permit easier viewing of the example operative engagements between the adjustment driver 400 and each of the archwire cradle 200 and pivot-adjusting drum 300, as shown in FIG. 5.

As depicted in FIGS. 5-6, in some embodiments the pivotal operational engagement 404 between the adjustment driver 400 and the archwire cradle 200 may correspond to the adjustment driver 400 being an arm 406 extending from the archwire cradle 200. In the present disclosure, the term "extending" may be used to signify an operative engagement in which two separate elements are coupled together, or in which one element is a component portion of another element. For example, the adjustment driver 400 may correspond to a component portion of the archwire cradle 200. Alternatively, the adjustment driver 400 may be a separate component that is fixedly coupled (e.g., welded, bonded, glued, soldered, etc.) and/or pivotally coupled (e.g., via a ball and socket, hinged joint, hook, or another connection that allows relative movement of the adjustment driver 400 and the archwire cradle 200) to the archwire cradle 200.

In embodiments where the adjustment driver 400 is an arm 406 extending from the archwire cradle 200, the adjustment driver 400 may include a driver end portion 408 opposite the archwire cradle 200. In such embodiments, the rotational operational engagement 402 may correspond to an engagement between the driver end portion 408 of the adjustment driver 400 and a surface 312 of the pivot-adjusting drum 300. For example, as shown in FIGS. 4-5, the driver end portion 408 may be configured to contact and move along the surface 312 of the pivot-adjusting drum 300 as the pivot-adjusting drum 300 is rotated, which in turn causes a translation of the driver end portion 408. This translation of the driver end portion 408 causes the adjustment driver 400 to direct and/or guide the pivot position of the archwire cradle 200 in correspondence with the translation. Thus, in the example embodiment illustrated in FIGS. 4-5, as the pivot-adjusting drum 300 is rotated in a clockwise direction, the archwire cradle 200 is pivoted away from the pivot-adjusting drum 300. Similarly, when the pivot-adjusting drum 300 depicted in FIGS. 4-5 is rotated in a counter-clockwise direction, the archwire cradle 200 is pivoted toward the pivot-adjusting drum 300.

According to the present disclosure, the surface 312 of the pivot-adjusting drum 300 may be a ramped surface, a slide surface, a track, a race, a channel, and/or be otherwise configured to allow the driver end portion 408 to contact and move along the surface 312. The driver end portion 408 may correspond to a slide arm portion, a race interface, a roller, and/or may include a driver end component that facilitates the movement of the driver end portion 408 along the surface 312 of the pivot-adjusting drum 300. The surface 312 is configured to translate the adjustment driver 400 as the driver end portion 408 moves along the ramped surface. For example, a surface 312 may be a surface of a helical segment that encircles the adjustment axis 304. In such an embodiment, as the driver end portion 408 moves along a surface 312 of such a helical segment, the adjustment driver 400 is translated in a direction towards or away from the surface of tooth 12.

As illustrated in FIGS. 4-5, in some embodiments the surface 312 of the pivot-adjusting drum 300 may be a lower surface 314 of the pivot-adjusting drum 300, and the pivot-adjusting drum 300 may further include an upper surface 316 of the pivot-adjusting drum 300. In FIGS. 4-5, the driver end portion 408 is depicted as being configured to contact and move along an upper ramped surface 314 of the pivot-adjusting drum in correspondence with an adjustment force imparted to the pivot-adjusting drum 300 in one of a clockwise rotation and a counter-clockwise rotation. FIGS. 4-5 also depict the driver end portion 408 as being configured to contact and move along the lower surface 314 of the pivot-adjusting drum 300 in correspondence with an adjustment force imparted to the pivot-adjusting drum 300 in the other of the clockwise rotation and the counter-clockwise rotation. In such embodiments, moving along the upper surface 316 of the pivot-adjusting drum 300 may cause the driver end portion 408 to be translated such that the archwire cradle 200 pivots in a first direction (e.g., towards the pivot-adjusting drum, etc.), and moving along the lower surface 314 of the pivot-adjusting drum 300 may cause the driver end portion 408 to be translated such that the archwire cradle 200 pivots in a second direction that is opposite the first direction (e.g., away from the pivot-adjusting drum, etc.). As shown in FIGS. 4-5, the upper ramped surface 316 may be generally parallel to the lower ramped surface 314.

In FIG. 6, a side view of the bracket assembly 50 is shown with the archwire cradle 200 being shown in a first pivot position 600 and a second pivot position 610. Specifically, FIG. 6 illustrates how a translation 620 of the adjustment driver 300 (e.g., such as a translation responsive to an adjustment force imparted to the pivot-adjusting drum 300) results in the adjustment driver causing a pivot 630 of the archwire cradle 200 from the first pivot position 600 to the second pivot position 610. Accordingly, due to this repositioning of the archwire cradle 200, and thus repositioning of the archwire within the elongate archwire passage 206, the translation of the adjusting drum results in different prescriptive forces being imparted to a tooth to which the bracket assembly is mounted during orthodontic use of the bracket assembly.

FIG. 7 illustrates another example of a bracket assembly 10 according to the present disclosure. The bracket assembly 10 of FIG. 7 provides an example of a bracket assembly in which the adjustment driver extends from the pivot-adjusting drum instead of the archwire cradle. As shown, the rotational operational engagement 402 between the adjustment driver 400 and the pivot-adjusting drum 300 corresponds to the adjustment driver 400 being an arm 406 extending from the pivot-adjusting drum 300. In such embodiments, the driver end portion 408 of the adjustment driver 400 is located opposite the pivot-adjusting drum 300. For example, the adjustment driver 400 may be an arm 406 that has a first end 412 that is attached to the pivot-adjusting drum 300 and a second end 414 that contacts and moves along a surface 226 of the archwire cradle 200. In such embodiments, a rotation of the pivot-adjusting drum 300 causes the second end 414 to move along the surface 226 of the archwire cradle 200, where the second end 414 moving along the surface 226 of the archwire cradle 200 causes the archwire cradle 200 to pivot. In this way, when the pivot-adjusting drum 300 rotates, the adjustment driver 400 is translated, which in turn guides the pivot position of the archwire cradle 200 within the range of pivot positions and in correspondence with the rotation of the pivot-adjusting drum 300.

As illustrated in the example shown in FIG. 7, a rotation of the pivot-adjusting drum 300 causes the adjustment driver 400 to be translated in a direction towards the archwire cradle 200. As the adjustment driver 400 is translated towards the archwire cradle 200, the driver end portion 408 presses against the surface 226 of the archwire cradle 200 (i.e., the archwire cradle engagement surface), causing the archwire cradle 200 and the elongate archwire passage 206 to pivot away from the pivot-adjusting drum 300. Likewise, in such an embodiment, when the pivot-adjusting drum 300 is rotated in an opposite direction, the adjustment driver 400 is translated in a direction away from the archwire cradle 200. FIG. 7 also illustrates pivot-adjusting drum 300 as having a narrower diameter than in FIGS. 3-6 to illustrate graphically that drum 300 optionally may have relative shapes and sizes other than as shown in FIGS. 3-6.

As depicted in FIG. 7, the pivotal operational engagement 404 between the adjustment driver 400 and the archwire cradle 200 may include a mechanical connection 416 (e.g., socket, hook, pin, joint, ball joint, clasp, gear, hinge, etc.) that applies a pulling force that guides the archwire cradle 200 in correspondence with the adjustment driver 400 being translated away from the archwire cradle 200. For example, FIG. 7 illustrates archwire cradle 200 as including a race 232 that receives the second end 414 of the arm 406, and which is configured to allow the second end 414 to move along the surface 226 while mechanically preventing the second end 414 from moving out of the race 232. Race 232 additionally or alternatively may be referred to as a channel 232, a track 232, and/or a slotted track 232. Race 232 thus may include a neck 233 that is sized to restrict removal of second end 414 as the second end moves within the race.

In the example shown in FIG. 7, as the arm 406 is translated in a direction away from the archwire cradle 200, the second end moves within the race 232 and along the surface in a direction away from the cradle coupling mechanism 802. Similarly, as the arm 406 is translated in a direction towards the archwire cradle 200, the second end moves within the race 232 and along the surface in a direction toward the cradle coupling mechanism 802.

In some embodiments, the archwire cradle 200 may also include one or more closures 334 that are selectively configured between an open configuration and a closed configuration, optionally without damage to the closure and/or archwire cradle. The closures 234 allow the second end 414 to be inserted into the race 232 when in the open configuration, and the closures prevent the second end 414 from escaping the race 232 when in the closed configuration. Closures 234, when present may be fixedly or removably coupled to the archwire cradle to secure second end 414 of arm 406 within the race. This may occur during manufacture and/or assembly of the bracket assembly or thereafter. Closures 234 additionally or alternatively may be referred to as gates 234, retainers 234, detents 234, and/or guides 234.

Alternatively, or in addition, the bracket assembly may include an archwire cradle biasing mechanism 510. As shown in FIG. 7, the archwire cradle biasing mechanism 510 may apply an adjustment force 520 that biases the archwire cradle 200 towards the adjustment driver 400, causing the archwire cradle 200 to pivot towards the adjustment driver 400 in correspondence with the adjustment driver 400 being translated away from the archwire cradle 200.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, and/or embodiments according to the present disclosure, are intended to convey that the described component, feature, detail, structure, and/or embodiment is an example of components, features, details, structures, and/or embodiments according to the present disclosure. Thus, the described component, feature, detail, structure, and/or embodiment is not intended to be limiting, required, or exclusive/exhaustive; and other components, features, details, structures, and/or embodiments, including structurally and/or functionally similar and/or equivalent components, features, details, structures, and/or embodiments, are also within the scope of the present disclosure.

Examples of adjustable-prescription orthodontic brackets and methods according to the present disclosure are presented in the following enumerated paragraphs.

A1. An orthodontic bracket assembly, comprising: a bracket base configured to be coupled to a patient's tooth; an archwire cradle pivotally coupled to the bracket base and configured to pivot about a cradle axis between a range of pivot positions, the archwire cradle including an elongate archwire passage that (i) is sized to receive an archwire during orthodontic use of the orthodontic bracket assembly, and (ii) includes an inlet through which the archwire is selectively inserted into the elongate archwire passage; a pivot-adjusting drum that is rotationally coupled to the bracket base for rotational movement relative to the bracket base about an adjustment axis in response to an adjustment force imparted to the pivot-adjusting drum; and an adjustment driver in operative engagement with each of the pivot-adjusting drum and the archwire cradle and configured to pivot the archwire cradle, including the elongate archwire passage, about the cradle axis to a selected pivot position in correspondence with the adjustment force imparted to the pivot-adjusting drum.

A2.1. The orthodontic bracket assembly of paragraph A1, wherein the pivot-adjusting drum includes a cylindrical structure, wherein the adjustment axis corresponds to a cylindrical axis of the cylindrical structure.

A2.2. The orthodontic bracket assembly of any of paragraphs A1-A2.1, wherein the adjustment axis is parallel to a surface of the patient's tooth during orthodontic use of the bracket assembly.

A2.3. The orthodontic bracket assembly of any of paragraphs A1-A2.1, wherein the adjustment axis is perpendicular to a surface of the patient's tooth during orthodontic use of the bracket assembly.

A2.4. The orthodontic bracket assembly of any of paragraphs A1-A2.3, wherein the adjustment axis is transverse to the cradle axis.

A2.5. The orthodontic bracket assembly of any of paragraphs A2.1-A2.4, wherein the cylindrical structure includes a threaded section that causes the cylindrical structure to rotate about the adjustment axis in response to the rotation of the pivot-adjusting drum relative to the bracket base.

A2.6. The orthodontic bracket assembly of any of paragraphs A1-A2.5, wherein the bracket base includes an occlusal side and a gingival side that is opposite the occlusal side, and further wherein the pivot-adjusting drum is coupled to the bracket base between the archwire cradle and the gingival side.

A3.1. The orthodontic bracket assembly of any of paragraphs A1-A2.6, wherein the archwire cradle includes a recess that is configured to receive at least a portion of the pivot-adjusting drum as the archwire cradle pivots about the cradle axis.

A3.2. The orthodontic bracket assembly of any of paragraphs A1-A3.1, wherein the elongate archwire passage defines an archwire longitudinal axis, and wherein the cradle axis is parallel to the archwire longitudinal axis.

A3.3. The orthodontic bracket assembly of any of paragraphs A1-A3.2, wherein the elongate archwire passage is formed, at least in part, by two generally parallel wall structures of the archwire cradle.

A3.4. The orthodontic bracket assembly of paragraph A3.3, wherein at least one of the wall structures includes a lumen located proximate an end of the corresponding wall structure.

A3.5. The orthodontic bracket assembly of any of paragraphs A1-A3.4, wherein in each pivot position of the range of pivot positions, the archwire cradle defines a different prescriptive force to be applied to the patient's tooth during orthodontic use of the bracket assembly.

A4.1. The orthodontic bracket assembly of any of paragraphs A1-A3.5, wherein the adjustment driver is configured to pivot the archwire cradle about the cradle axis in correspondence with a magnitude of the rotation of the pivot-adjusting drum about the adjustment axis.

A4.2. The orthodontic bracket assembly of any of paragraphs A1-A4.1, wherein the adjustment driver is configured to pivot the archwire cradle about the cradle axis in a pivot direction away from the pivot-adjusting drum in correspondence with the pivot-adjusting drum rotating about the adjustment axis in one of a clockwise direction and a counter-clockwise direction.

A4.2.1. The orthodontic bracket assembly of paragraph A4.2, wherein the adjustment driver is further configured to pivot the archwire cradle about the cradle axis in a pivot direction toward the pivot-adjusting drum in correspondence with the pivot-adjusting drum rotating about the adjustment axis in the other of the clockwise direction and the counter-clockwise direction.

A4.2.2. The orthodontic bracket assembly of paragraph A4.2.1, wherein the pivot direction away from the pivot-adjusting drum is opposed to the pivot direction toward the pivot-adjusting drum.

A4.2.3. The orthodontic bracket assembly of paragraph A4.2.2, further comprising an archwire cradle biasing mechanism configured to bias the archwire cradle toward a/the occlusal side of the bracket base.

A4.2.4. The orthodontic bracket assembly of paragraph A4.2.3, wherein the archwire cradle biasing mechanism is configured to pivot the archwire cradle in a pivot direction toward the pivot-adjusting drum in correspondence with the pivot-adjusting drum rotating about the adjustment axis in the other of the clockwise direction and the counter-clockwise direction, A4.2.5. The orthodontic bracket assembly of paragraph A4.2.4, wherein the pivot direction away from the pivot-adjusting drum is opposed to the pivot direction toward the pivot-adjusting drum.

A4.3.1. The orthodontic bracket assembly of any of paragraphs A1-A4.2.5, wherein the pivot-adjusting drum includes a ramped surface, wherein the adjustment driver includes an arm that extends from the archwire cradle, and wherein the arm contacts and moves along the ramped surface in one of a/the clockwise direction and a/the counter-clockwise direction in correspondence with the adjustment force imparted to the pivot-adjusting drum.

A4.3.2. The orthodontic bracket assembly of paragraph A4.3.1, wherein the arm is configured to pivot the archwire cradle in correspondence with the arm moving along the ramped surface.

A4.3.3. The orthodontic bracket assembly of paragraph A4.3.2, wherein the pivot-adjusting drum includes the ramped surface as a helical segment that encircles the adjustment axis.

A4.3.4. The orthodontic bracket assembly of paragraph A4.3.3, wherein the ramped surface is a lower ramped surface, and the pivot-adjusting drum further includes an upper ramped surface as a helical segment that encircles the adjustment axis.

A4.3.5. The orthodontic bracket assembly of paragraph A4.3.4, wherein the upper ramped surface is spaced-apart from the lower ramped surface such that the pivot-adjusting drum includes a helical channel, and wherein the lower ramped surface defines a lower boundary of the helical channel and the upper ramped surface defines an upper boundary of the helical channel.

A4.3.6. The orthodontic bracket assembly of any of paragraphs A4.3.4-A4.3.5, wherein the upper ramped surface is generally parallel to the lower ramped surface.

A4.3.7. The orthodontic bracket assembly of any of paragraphs A4.3.4-A4.3.6, wherein the arm of the archwire cradle is configured to contact and move along the upper ramped surface in correspondence with the adjustment force imparted to the pivot-adjusting drum in the other of the clockwise pivot direction and the counter-clockwise pivot direction.

A4.3.8. The orthodontic bracket assembly of any of paragraphs A4.3.1-A4.3.7, wherein the ramped surface includes a race that extends along the ramped surface, and wherein the arm includes a race interface that is configured to contact and move along the race.

A4.3.9. The orthodontic bracket assembly of any of paragraphs A4.3.1-A4.3.8, wherein the arm includes a roller that is configured to contact and roll along the ramped surface in correspondence with the adjustment force imparted to the pivot-adjusting drum in the clockwise pivot direction and/or the counter-clockwise pivot direction.

A4.3.10. The orthodontic bracket assembly of any of paragraphs A4.3.1-A4.3.8, wherein the ramped surface is a ramped slide surface, and the arm is a slide arm that is configured to contact and slide along the ramped slide surface.

A4.4.1. The orthodontic bracket assembly of any of paragraphs A1-A4.2.5, wherein the archwire cradle includes an archwire cradle engagement surface, wherein the adjustment driver corresponds to an arm that extends from the pivot-adjusting drum, and wherein the arm contacts and moves along the archwire cradle engagement surface in correspondence with the adjustment force imparted to the pivot-adjusting drum.

A5.1. The orthodontic bracket assembly of any of paragraphs A1-A4.4.1, further comprising an archwire cradle securement in engagement between the bracket base and the archwire cradle, wherein the archwire cradle securement is configured to secure the archwire cradle, including the elongate archwire passage, in the selected pivot position in response to a/the imparted adjustment rotation of the pivot-adjusting drum.

A5.2. The orthodontic bracket assembly of paragraph A5.1, wherein the archwire cradle securement includes a spring pin that extends along the cradle axis and is in engagement between the bracket base and the archwire cradle A5.3. The orthodontic bracket assembly of any of paragraphs A1-A5.2, further comprising a drum securement in engagement between the bracket base and the pivot-adjusting drum, wherein the drum securement is configured to secure the pivot-adjusting drum, including the elongate archwire passage, in the selected pivot position in response to a/the imparted adjustment rotation of the pivot-adjusting drum.

A5.4. The orthodontic bracket assembly of paragraph A5.3, wherein the drum securement includes a spring pin that extends transverse to the adjustment axis and is in engagement between the bracket base and the pivot-adjusting drum.

A5.5. The orthodontic bracket assembly of any of paragraphs A5.3-A5.4, wherein the adjustment driver is in operative engagement with an internal side of the pivot-adjusting drum that is proximate the archwire cradle, and wherein the drum securement is in engagement between the bracket base and the pivot-adjusting drum along a distal side of the pivot-adjusting drum that is opposite the internal side.

A5.6. The orthodontic bracket assembly of paragraph A5.5, wherein the pivot-adjusting drum includes a securement shoulder along the distal side, and wherein the bracket assembly further includes a pivot securement in engagement between the bracket base and the securement shoulder of the pivot-adjusting drum.

A6.1. The orthodontic bracket assembly of any of paragraphs A1-A5.6, wherein the pivot-adjusting drum includes a receiver configured to (i) engage with an adjustment tool, and (ii) receive the adjustment force from the adjustment tool.

A6.2. The orthodontic bracket assembly of paragraph A6.1, wherein the receiver is further configured to disengage one or more of a/the drum securement and a/the archwire cradle securement in response to the adjustment tool engaging with the receiver.

B1. A method for pivoting an archwire cradle and an elongate archwire passage of an orthodontic bracket assembly to a selected pivot position, the method comprising: receiving, by a pivot-adjusting drum of the bracket assembly, an imparted adjustment rotation; rotating the pivot-adjusting drum about an adjustment axis in correspondence to the adjustment rotation imparted to the pivot-adjusting drum; and rotating the archwire cradle and the elongate archwire passage about a cradle axis and to the selected pivot position in correspondence with the rotating of the pivot-adjusting drum, wherein the adjustment axis is transverse to the cradle axis.

B2. The method of paragraph B1, wherein the rotating the archwire cradle and the elongate archwire passage about the cradle axis is caused by an arm that is in operative engagement with both the archwire cradle and the pivot-adjusting drum.

B3. The method of any of paragraphs B1-B2, further comprising receiving, by an archwire inlet defined by the elongate archwire passage, an orthodontic archwire.

B4. The method of any of paragraphs B1-B3, wherein the orthodontic bracket assembly is the orthodontic bracket assembly of any of paragraphs A1-A6.2.

C1. Use of the orthodontic bracket assembly of any of paragraphs A1-A6.2 to perform the method of any of paragraphs B1-B4.

C2. Use of the method of any of paragraphs B1-B3 to adjust a prescription imparted by the orthodontic bracket of any of paragraphs A1-A6.2.

INDUSTRIAL APPLICABILITY

The orthodontic bracket assemblies and methods disclosed herein are applicable to the dental and orthodontics industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, also are regarded as included within the subject matter of the inventions of the present disclosure.

The invention claimed is:

1. An orthodontic bracket assembly, comprising:
   a bracket base configured to be coupled to a patient's tooth;
   an archwire cradle pivotally coupled to the bracket base and configured to pivot about a cradle axis between a range of pivot positions, the archwire cradle including an elongate archwire passage that (i) is sized to receive an archwire during orthodontic use of the orthodontic bracket assembly, and (ii) includes an inlet through which the archwire is selectively inserted into the elongate archwire passage;
   a pivot-adjusting drum that is rotationally coupled to the bracket base for rotational movement relative to the bracket base about an adjustment axis in response to an adjustment force imparted to the pivot-adjusting drum, wherein the adjustment axis is transverse to the cradle axis; and
   an adjustment driver in operative engagement with each of the pivot-adjusting drum and the archwire cradle and configured to pivot the archwire cradle, including the elongate archwire passage, about the cradle axis to a selected pivot position in correspondence with the adjustment force imparted to the pivot-adjusting drum;
   wherein the pivot-adjusting drum includes a ramped surface, and the adjustment driver includes an arm that extends from the archwire cradle, wherein the arm contacts and moves along the ramped surface in one of a clockwise pivot direction and a counter-clockwise pivot direction in correspondence with the adjustment force imparted to the pivot-adjusting drum, wherein the arm is configured to pivot the archwire cradle in correspondence with the arm moving along the ramped surface, and wherein the pivot-adjusting drum includes the ramped surface as a helical segment that encircles the adjustment axis.

2. The orthodontic bracket assembly of claim 1, wherein the adjustment driver is configured to pivot the archwire cradle about the cradle axis in one of a clockwise pivot direction and a counter-clockwise pivot direction away from the pivot-adjusting drum in correspondence with the pivot-adjusting drum rotating about the adjustment axis in one of a clockwise direction and a counter-clockwise direction; and further wherein the adjustment driver is further configured to pivot the archwire cradle about the cradle axis in the other of the clockwise pivot direction and the counter-clockwise pivot direction toward the pivot-adjusting drum in correspondence with the pivot-adjusting drum rotating about the adjustment axis in the other of the clockwise direction and the counter-clockwise direction.

3. The orthodontic bracket assembly of claim 2, further including a biasing mechanism configured to pivot the archwire cradle in the other of the clockwise pivot direction and the counter-clockwise pivot direction toward the pivot-adjusting drum in correspondence with the pivot-adjusting drum rotating about the adjustment axis in the other of the clockwise direction and the counter-clockwise direction.

4. The orthodontic bracket assembly of claim 1, wherein the ramped surface is a lower ramped surface, and the pivot-adjusting drum further includes an upper ramped surface as a helical segment that encircles the adjustment axis.

5. The orthodontic bracket assembly of claim 4, wherein the upper ramped surface is spaced-apart from the lower ramped surface such that the pivot-adjusting drum includes a helical channel that encircles the adjustment axis, wherein the lower ramped surface defines a lower boundary of the helical channel and the upper ramped surface defines an upper boundary of the helical channel.

6. The orthodontic bracket assembly of claim 4, wherein the arm of the adjustment driver is configured to contact and move along the upper ramped surface in correspondence with the adjustment force imparted to the pivot-adjusting drum in the other of the clockwise pivot direction and the counter-clockwise pivot direction.

7. The orthodontic bracket assembly of claim 1, wherein the ramped surface includes a race that extends along the ramped surface, and the arm includes a race interface that is configured to contact and move along the race.

8. The orthodontic bracket assembly of claim 1, wherein the arm includes a roller that is configured to contact and roll along the ramped surface in correspondence with the adjustment force imparted to the pivot-adjusting drum in the clockwise pivot direction and the counter-clockwise pivot direction.

9. The orthodontic bracket assembly of claim 1, wherein the ramped surface is a ramped slide surface, and the arm is a slide arm that is configured to contact and slide along the ramped slide surface.

10. The orthodontic bracket assembly of claim 1, comprising an archwire cradle securement in engagement between the bracket base and the archwire cradle, wherein the archwire cradle securement is configured to secure the archwire cradle, including the elongate archwire passage, in the selected pivot position in response to the imparted adjustment force of the pivot-adjusting drum.

11. The orthodontic bracket assembly of claim 1, wherein the pivot-adjusting drum includes a receiver configured to (i) engage with an adjustment tool, and (ii) receive the adjustment force from the adjustment tool.

12. The orthodontic bracket assembly of claim 1, wherein the pivot-adjusting drum includes a cylindrical structure, wherein the adjustment axis corresponds to a cylindrical axis of the cylindrical structure.

13. An orthodontic bracket assembly, comprising:
a bracket base configured to be coupled to a patient's tooth;
an archwire cradle pivotally coupled to the bracket base and configured to pivot about a cradle axis between a range of pivot positions, the archwire cradle including an elongate archwire passage that (i) is sized to receive an archwire during orthodontic use of the orthodontic bracket assembly, and (ii) includes an inlet through which the archwire is selectively inserted into the elongate archwire passage;
a pivot-adjusting drum that is rotationally coupled to the bracket base for rotational movement relative to the bracket base about an adjustment axis in response to an adjustment force imparted to the pivot-adjusting drum, wherein the adjustment axis is transverse to the cradle axis; and
an adjustment driver in operative engagement with each of the pivot-adjusting drum and the archwire cradle and configured to pivot the archwire cradle, including the elongate archwire passage, about the cradle axis to a selected pivot position in correspondence with the adjustment force imparted to the pivot-adjusting drum;
wherein the pivot-adjusting drum includes a ramped surface, and the adjustment driver includes an arm that extends from the archwire cradle, wherein the arm contacts and moves along the ramped surface in one of a clockwise pivot direction and a counter-clockwise pivot direction in correspondence with the adjustment force imparted to the pivot-adjusting drum, and wherein the ramped surface includes a race that extends along the ramped surface, and the arm includes a race interface that is configured to contact and move along the race.

14. The orthodontic bracket assembly of claim 13, wherein the adjustment driver is configured to pivot the archwire cradle about the cradle axis in one of a clockwise pivot direction and a counter-clockwise pivot direction away from the pivot-adjusting drum in correspondence with the pivot-adjusting drum rotating about the adjustment axis in one of a clockwise direction and a counter-clockwise direction; and further wherein the adjustment driver is further configured to pivot the archwire cradle about the cradle axis in the other of the clockwise pivot direction and the counter-clockwise pivot direction toward the pivot-adjusting drum in correspondence with the pivot-adjusting drum rotating about the adjustment axis in the other of the clockwise direction and the counter-clockwise direction.

15. The orthodontic bracket assembly of claim 14, further including a biasing mechanism configured to pivot the archwire cradle in the other of the clockwise pivot direction and the counter-clockwise pivot direction toward the pivot-adjusting drum in correspondence with the pivot-adjusting drum rotating about the adjustment axis in the other of the clockwise direction and the counter-clockwise direction.

16. The orthodontic bracket assembly of claim 13, wherein the race interface of the arm includes a roller that is configured to contact and roll along the ramped surface in correspondence with the adjustment force imparted to the pivot-adjusting drum in the clockwise pivot direction and the counter-clockwise pivot direction.

17. The orthodontic bracket assembly of claim 13, wherein the ramped surface is a ramped slide surface, and the arm is a slide arm that is configured to contact and slide along the ramped slide surface.

18. The orthodontic bracket assembly of claim 13, comprising an archwire cradle securement in engagement between the bracket base and the archwire cradle, wherein the archwire cradle securement is configured to secure the archwire cradle, including the elongate archwire passage, in the selected pivot position in response to the imparted adjustment force of the pivot-adjusting drum.

19. The orthodontic bracket assembly of claim 13, wherein the pivot-adjusting drum includes a receiver configured to (i) engage with an adjustment tool, and (ii) receive the adjustment force from the adjustment tool.

20. The orthodontic bracket assembly of claim 13, wherein the pivot-adjusting drum includes a cylindrical structure, wherein the adjustment axis corresponds to a cylindrical axis of the cylindrical structure.

21. An orthodontic bracket assembly, comprising:
a bracket base configured to be coupled to a patient's tooth;
an archwire cradle pivotally coupled to the bracket base and configured to pivot about a cradle axis between a range of pivot positions, the archwire cradle including an elongate archwire passage that (i) is sized to receive an archwire during orthodontic use of the orthodontic bracket assembly, and (ii) includes an inlet through which the archwire is selectively inserted into the elongate archwire passage;
a pivot-adjusting drum that is rotationally coupled to the bracket base for rotational movement relative to the bracket base about an adjustment axis in response to an adjustment force imparted to the pivot-adjusting drum, wherein the adjustment axis is transverse to the cradle axis; and
an adjustment driver in operative engagement with each of the pivot-adjusting drum and the archwire cradle and configured to pivot the archwire cradle, including the elongate archwire passage, about the cradle axis to a selected pivot position in correspondence with the adjustment force imparted to the pivot-adjusting drum;
wherein the pivot-adjusting drum includes a ramped surface, and the adjustment driver includes an arm that extends from the archwire cradle, wherein the arm contacts and moves along the ramped surface in one of a clockwise pivot direction and a counter-clockwise pivot direction in correspondence with the adjustment force imparted to the pivot-adjusting drum, and wherein the ramped surface is a ramped slide surface, and the arm is a slide arm that is configured to contact and slide along the ramped slide surface.

22. The orthodontic bracket assembly of claim 21, wherein the adjustment driver is configured to pivot the archwire cradle about the cradle axis in one of a clockwise pivot direction and a counter-clockwise pivot direction away from the pivot-adjusting drum in correspondence with the pivot-adjusting drum rotating about the adjustment axis in one of a clockwise direction and a counter-clockwise direction; and further wherein the adjustment driver is further configured to pivot the archwire cradle about the cradle axis in the other of the clockwise pivot direction and the counter-clockwise pivot direction toward the pivot-adjusting drum in correspondence with the pivot-adjusting drum rotating about the adjustment axis in the other of the clockwise direction and the counter-clockwise direction.

23. The orthodontic bracket assembly of claim 22, further including a biasing mechanism configured to pivot the archwire cradle in the other of the clockwise pivot direction and the counter-clockwise pivot direction toward the pivot-adjusting drum in correspondence with the pivot-adjusting drum rotating about the adjustment axis in the other of the clockwise direction and the counter-clockwise direction.

24. The orthodontic bracket assembly of claim 21, wherein the ramped surface is a lower ramped surface, and the pivot-adjusting drum further includes an upper ramped surface as a helical segment that encircles the adjustment axis.

25. The orthodontic bracket assembly of claim 24, wherein the upper ramped surface is spaced-apart from the lower ramped surface such that the pivot-adjusting drum includes a helical channel that encircles the adjustment axis, wherein the lower ramped surface defines a lower boundary of the helical channel and the upper ramped surface defines an upper boundary of the helical channel.

26. The orthodontic bracket assembly of claim 24, wherein the arm of the adjustment driver is configured to contact and slide along the upper ramped surface in correspondence with the adjustment force imparted to the pivot-adjusting drum in the other of the clockwise pivot direction and the counter-clockwise pivot direction.

27. The orthodontic bracket assembly of claim 21, comprising an archwire cradle securement in engagement between the bracket base and the archwire cradle, wherein the archwire cradle securement is configured to secure the archwire cradle, including the elongate archwire passage, in the selected pivot position in response to the imparted adjustment force of the pivot-adjusting drum.

28. The orthodontic bracket assembly of claim 21, wherein the pivot-adjusting drum includes a receiver configured to (i) engage with an adjustment tool, and (ii) receive the adjustment force from the adjustment tool.

29. The orthodontic bracket assembly of claim 21, wherein the pivot-adjusting drum includes a cylindrical structure, wherein the adjustment axis corresponds to a cylindrical axis of the cylindrical structure.

30. An orthodontic bracket assembly, comprising:
a bracket base configured to be coupled to a patient's tooth;
an archwire cradle pivotally coupled to the bracket base and configured to pivot about a cradle axis between a range of pivot positions, the archwire cradle including an elongate archwire passage that (i) is sized to receive an archwire during orthodontic use of the orthodontic bracket assembly, and (ii) includes an inlet through which the archwire is selectively inserted into the elongate archwire passage;
a pivot-adjusting drum that is rotationally coupled to the bracket base for rotational movement relative to the bracket base about an adjustment axis in response to an adjustment force imparted to the pivot-adjusting drum, wherein the adjustment axis is transverse to the cradle axis; and
an adjustment driver in operative engagement with each of the pivot-adjusting drum and the archwire cradle and configured to pivot the archwire cradle, including the elongate archwire passage, about the cradle axis to a selected pivot position in correspondence with the adjustment force imparted to the pivot-adjusting drum;
wherein the archwire cradle includes an archwire cradle engagement surface, wherein the adjustment driver includes an arm that extends from the pivot-adjusting drum, and wherein the arm contacts and moves along the archwire cradle engagement surface in correspondence with the adjustment force imparted to the pivot-adjusting drum.

31. The orthodontic bracket assembly of claim 30, wherein the adjustment driver is configured to pivot the archwire cradle about the cradle axis in one of a clockwise pivot direction and a counter-clockwise pivot direction away from the pivot-adjusting drum in correspondence with the pivot-adjusting drum rotating about the adjustment axis in one of a clockwise direction and a counter-clockwise direction; and further wherein the adjustment driver is further configured to pivot the archwire cradle about the cradle axis in the other of the clockwise pivot direction and the counter-clockwise pivot direction toward the pivot-adjusting drum in correspondence with the pivot-adjusting drum rotating about the adjustment axis in the other of the clockwise direction and the counter-clockwise direction.

32. The orthodontic bracket assembly of claim 31, further including a biasing mechanism configured to pivot the archwire cradle in the other of the clockwise pivot direction and the counter-clockwise pivot direction toward the pivot-adjusting drum in correspondence with the pivot-adjusting drum rotating about the adjustment axis in the other of the clockwise direction and the counter-clockwise direction.

33. The orthodontic bracket assembly of claim 30, wherein the arm includes a first end that is attached to the pivot-adjusting drum and a second end that contacts and moves along the archwire cradle engagement surface, wherein the archwire cradle further includes a race that receives the second end of the arm and that is configured to permit the second end of the arm to move along the archwire cradle engagement surface while restricting removal of the second end of the arm from the race.

34. The orthodontic bracket assembly of claim 30, wherein the pivot-adjusting drum includes a receiver configured to (i) engage with an adjustment tool, and (ii) receive the adjustment force from the adjustment tool.

35. The orthodontic bracket assembly of claim 30, wherein the pivot-adjusting drum includes a cylindrical structure, wherein the adjustment axis corresponds to a cylindrical axis of the cylindrical structure.

\* \* \* \* \*